(12) United States Patent
Nielsen et al.

(10) Patent No.: US 8,700,325 B2
(45) Date of Patent: Apr. 15, 2014

(54) MARKING APPARATUS AND METHODS FOR CREATING AN ELECTRONIC RECORD OF MARKING OPERATIONS

(75) Inventors: Steven E. Nielsen, North Palm Beach, FL (US); Curtis Chambers, Palm Beach Gardens, FL (US); Jeffrey Farr, Jupiter, FL (US); Mark A. Conner, Palmetto, FL (US); Rene A. Vazquez, Herndon, VA (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 931 days.

(21) Appl. No.: 12/364,369

(22) Filed: Feb. 2, 2009

(65) Prior Publication Data

US 2009/0208642 A1     Aug. 20, 2009

Related U.S. Application Data

(63) Continuation of application No. 12/363,951, filed on Feb. 2, 2009, which is a continuation-in-part of application No. 11/685,602, filed on Mar. 13, 2007, now Pat. No. 7,640,105, and a continuation-in-part of application No. 11/696,606, filed on Apr. 4, 2007, now Pat. No. 8,060,304.

(51) Int. Cl.
   *G01C 21/00*     (2006.01)
(52) U.S. Cl.
   USPC .......................................... 701/521; 427/137
(58) Field of Classification Search
   USPC ............ 427/137; 340/988; 701/213, 214, 521
   See application file for complete search history.

(56) References Cited

U.S. PATENT DOCUMENTS

| | | | |
|---|---|---|---|
| 3,871,557 A | 3/1975 | Smrt | |
| 3,972,038 A | 7/1976 | Fletcher et al. | |
| 3,974,491 A | 8/1976 | Sipe | |
| 3,988,922 A | 11/1976 | Clark et al. | |

(Continued)

FOREIGN PATENT DOCUMENTS

| | | |
|---|---|---|
| CA | 2623761 | 10/2008 |
| CA | 2623466 | 6/2011 |

(Continued)

OTHER PUBLICATIONS

Bearden, T., "New Identification Technology Raises Concerns over Privacy," PBS Online NewsHour Report, Aug. 17, 2006, pp. 1-5, http://www.pbs.org/newshour/bb/science/july-dec06/rfid_08-17.html.

(Continued)

*Primary Examiner* — Mark Hellner

(57) ABSTRACT

A marking system may hold a container from which markers are dispensed to mark the presence or absence of an underground facility in a dig area. The container may identify a marker characteristic regarding the markers in the container. The marking system may receive activation of a trigger, dispense a marker from the container when the trigger is activated, and store the marker characteristic and time data when the trigger is activated. In other embodiments, the marking system may dispense a marker, determine location data and/or time data, and substantially simultaneously trigger the dispensing of the marker and logging of the location data and/or the time data. The location data identifies a geographic location where the marker is dispensed and the time data identifies the time when the marker is dispensed.

20 Claims, 6 Drawing Sheets

(56) References Cited

U.S. PATENT DOCUMENTS

| | | |
|---|---|---|
| 4,258,320 A | 3/1981 | Schonstedt |
| 4,387,340 A | 6/1983 | Peterman |
| 4,388,592 A | 6/1983 | Schonstedt |
| 4,520,317 A | 5/1985 | Peterman |
| 4,536,710 A | 8/1985 | Dunham |
| 4,539,522 A | 9/1985 | Schonstedt |
| 4,590,425 A | 5/1986 | Schonstedt |
| 4,623,282 A | 11/1986 | Allen |
| 4,639,674 A | 1/1987 | Rippingale |
| 4,712,094 A | 12/1987 | Bolson, Sr. |
| 4,747,207 A | 5/1988 | Schonstedt et al. |
| 4,803,773 A | 2/1989 | Schonstedt |
| 4,818,944 A | 4/1989 | Rippingale |
| 4,839,623 A | 6/1989 | Schonstedt et al. |
| 4,839,624 A | 6/1989 | Schonstedt |
| 4,873,533 A | 10/1989 | Oike |
| 4,899,293 A | 2/1990 | Dawson et al. |
| 4,989,151 A | 1/1991 | Nuimura |
| 5,001,430 A | 3/1991 | Peterman et al. |
| 5,006,806 A | 4/1991 | Rippingale et al. |
| 5,014,008 A | 5/1991 | Flowerdew |
| 5,017,873 A | 5/1991 | Rippingale et al. |
| 5,025,150 A | 6/1991 | Oldham et al. |
| 5,043,666 A | 8/1991 | Tavernetti et al. |
| 5,045,368 A | 9/1991 | Cosman et al. |
| 5,065,098 A | 11/1991 | Salsman et al. |
| 5,093,622 A | 3/1992 | Balkman |
| 5,097,211 A | 3/1992 | Schonstedt |
| 5,114,517 A | 5/1992 | Rippingale et al. |
| 5,122,750 A | 6/1992 | Rippingale et al. |
| 5,136,245 A | 8/1992 | Schonstedt |
| 5,138,761 A | 8/1992 | Schonstedt |
| 5,150,295 A | 9/1992 | Mattingly |
| 5,173,139 A | 12/1992 | Rippingale et al. |
| 5,206,065 A | 4/1993 | Rippingale et al. |
| 5,214,757 A | 5/1993 | Mauney et al. |
| 5,231,355 A | 7/1993 | Rider et al. |
| 5,239,290 A | 8/1993 | Schonstedt |
| 5,260,659 A | 11/1993 | Flowerdew et al. |
| 5,264,795 A | 11/1993 | Rider |
| 5,299,300 A | 3/1994 | Femal |
| 5,329,464 A | 7/1994 | Sumic et al. |
| 5,361,029 A | 11/1994 | Rider |
| 5,365,163 A | 11/1994 | Satterwhite et al. |
| 5,373,298 A | 12/1994 | Karouby |
| 5,379,045 A | 1/1995 | Gilbert et al. |
| 5,381,338 A | 1/1995 | Wysocki |
| 5,389,149 A | 2/1995 | Carey et al. |
| 5,430,379 A | 7/1995 | Parkinson et al. |
| 5,444,364 A | 8/1995 | Satterwhite et al. |
| 5,467,271 A | 11/1995 | Abel et al. |
| 5,471,143 A | 11/1995 | Doany |
| 5,486,067 A | 1/1996 | Huynh |
| 5,490,646 A | 2/1996 | Shaw |
| 5,517,419 A | 5/1996 | Lanckton |
| 5,519,329 A | 5/1996 | Satterwhite |
| 5,529,433 A | 6/1996 | Huynh |
| 5,530,357 A | 6/1996 | Cosman et al. |
| 5,543,931 A | 8/1996 | Lee et al. |
| 5,553,407 A | 9/1996 | Stump |
| 5,568,162 A | 10/1996 | Samsel et al. |
| 5,576,973 A | 11/1996 | Haddy |
| 5,621,325 A | 4/1997 | Draper et al. |
| 5,629,626 A | 5/1997 | Russell et al. |
| 5,644,237 A | 7/1997 | Eslambolchi et al. |
| 5,659,985 A | 8/1997 | Stump |
| 5,673,050 A | 9/1997 | Moussally et al. |
| 5,689,415 A | 11/1997 | Calotychos et al. |
| 5,699,244 A | 12/1997 | Clark, Jr. |
| 5,704,142 A | 1/1998 | Stump |
| 5,734,348 A | 3/1998 | Aoki et al. |
| 5,739,785 A | 4/1998 | Allison et al. |
| 5,751,289 A | 5/1998 | Myers |
| 5,751,450 A | 5/1998 | Robinson |
| 5,764,127 A | 6/1998 | Hore et al. |
| 5,769,370 A | 6/1998 | Ashjaee |
| 5,819,859 A | 10/1998 | Stump et al. |
| 5,828,219 A | 10/1998 | Hanlon et al. |
| 5,848,373 A | 12/1998 | DeLorme et al. |
| 5,916,300 A | 6/1999 | Kirk et al. |
| 5,917,325 A | 6/1999 | Smith |
| 5,918,565 A | 7/1999 | Casas |
| 5,920,194 A | 7/1999 | Lewis et al. |
| 5,955,667 A | 9/1999 | Fyfe |
| 6,026,135 A | 2/2000 | McFee et al. |
| 6,031,454 A | 2/2000 | Lovejoy et al. |
| 6,032,530 A | 3/2000 | Hock |
| 6,037,010 A | 3/2000 | Kahmann et al. |
| 6,053,260 A | 4/2000 | Boon |
| 6,061,632 A | 5/2000 | Dreier |
| 6,064,940 A | 5/2000 | Rodgers |
| 6,074,693 A | 6/2000 | Manning |
| 6,075,481 A | 6/2000 | Eslambolchi |
| 6,095,081 A | 8/2000 | Gochenour |
| 6,107,801 A | 8/2000 | Hopwood et al. |
| 6,119,376 A | 9/2000 | Stump |
| 6,127,827 A | 10/2000 | Lewis |
| 6,130,539 A | 10/2000 | Polak |
| 6,138,906 A * | 10/2000 | DeMayo .................... 235/375 |
| 6,140,819 A | 10/2000 | Peterman et al. |
| 6,169,958 B1 | 1/2001 | Nagasamy et al. |
| 6,188,392 B1 | 2/2001 | O'Connor et al. |
| 6,188,777 B1 | 2/2001 | Darrell et al. |
| 6,206,282 B1 | 3/2001 | Hayes, Sr. et al. |
| 6,234,218 B1 | 5/2001 | Boers |
| 6,240,360 B1 | 5/2001 | Phelan |
| 6,268,731 B1 | 7/2001 | Hopwood et al. |
| 6,282,477 B1 | 8/2001 | Gudat et al. |
| 6,285,911 B1 | 9/2001 | Watts et al. |
| 6,292,108 B1 | 9/2001 | Straser et al. |
| 6,294,022 B1 | 9/2001 | Eslambolchi et al. |
| 6,297,736 B1 | 10/2001 | Lewis et al. |
| 6,299,934 B1 * | 10/2001 | Manning .................... 427/137 |
| 6,308,565 B1 | 10/2001 | French et al. |
| 6,320,518 B2 | 11/2001 | Saeki et al. |
| RE37,574 E | 3/2002 | Rawlins |
| 6,356,082 B1 | 3/2002 | Alkire et al. |
| 6,363,320 B1 | 3/2002 | Chou |
| 6,375,038 B1 | 4/2002 | Daansen et al. |
| 6,378,220 B1 | 4/2002 | Baioff et al. |
| 6,388,629 B1 | 5/2002 | Albats et al. |
| 6,390,336 B1 | 5/2002 | Orozco |
| 6,401,051 B1 | 6/2002 | Merriam |
| 6,407,550 B1 | 6/2002 | Parakulam et al. |
| 6,411,094 B1 | 6/2002 | Gard et al. |
| 6,437,708 B1 * | 8/2002 | Brouwer .................... 340/988 |
| 6,438,239 B1 | 8/2002 | Kuchen |
| 6,459,266 B1 | 10/2002 | Fling |
| 6,476,708 B1 | 11/2002 | Johnson |
| 6,477,588 B1 | 11/2002 | Yerazunis et al. |
| 6,490,524 B1 | 12/2002 | White et al. |
| 6,512,478 B1 | 1/2003 | Chien |
| 6,526,400 B1 | 2/2003 | Takata |
| 6,549,011 B2 | 4/2003 | Flatt |
| 6,552,548 B1 | 4/2003 | Lewis et al. |
| 6,585,133 B1 | 7/2003 | Brouwer |
| 6,600,420 B2 | 7/2003 | Goff et al. |
| 6,617,856 B1 | 9/2003 | Royle et al. |
| 6,633,163 B2 | 10/2003 | Fling |
| 6,650,293 B1 | 11/2003 | Eslambolchi |
| 6,650,798 B2 | 11/2003 | Russell et al. |
| 6,658,148 B1 | 12/2003 | Fung |
| 6,674,276 B2 | 1/2004 | Morgan et al. |
| 6,700,526 B2 | 3/2004 | Witten |
| 6,710,741 B2 | 3/2004 | Tucker |
| 6,717,392 B2 | 4/2004 | Pearson |
| 6,723,375 B2 | 4/2004 | Zeck et al. |
| 6,728,662 B2 | 4/2004 | Frost et al. |
| 6,751,552 B1 | 6/2004 | Minelli |
| 6,751,553 B2 | 6/2004 | Young |
| 6,751,554 B1 | 6/2004 | Asher et al. |
| 6,777,923 B2 | 8/2004 | Pearson |
| 6,778,128 B2 | 8/2004 | Tucker et al. |
| 6,798,379 B2 | 9/2004 | Tucker et al. |

(56) References Cited

U.S. PATENT DOCUMENTS

| | | |
|---|---|---|
| 6,799,116 B2 | 9/2004 | Robbins |
| 6,815,953 B1 | 11/2004 | Bigelow |
| 6,819,109 B2 | 11/2004 | Sowers et al. |
| 6,825,775 B2 | 11/2004 | Fling et al. |
| 6,825,793 B2 | 11/2004 | Taylor, Jr. et al. |
| 6,833,795 B1 | 12/2004 | Johnson et al. |
| 6,833,811 B2 | 12/2004 | Zeitfuss et al. |
| 6,836,231 B2 | 12/2004 | Pearson |
| 6,845,171 B2 | 1/2005 | Shum et al. |
| 6,850,161 B1 | 2/2005 | Elliott et al. |
| 6,850,843 B2 | 2/2005 | Smith et al. |
| 6,853,303 B2 | 2/2005 | Chen et al. |
| 6,865,484 B2 | 3/2005 | Miyasaka et al. |
| 6,898,525 B1 | 5/2005 | Minelli |
| 6,898,550 B1 | 5/2005 | Blackadar et al. |
| 6,904,361 B1 | 6/2005 | Tallman et al. |
| 6,941,890 B1 | 9/2005 | Cristo et al. |
| 6,947,028 B2 | 9/2005 | Shkolnikov |
| 6,954,071 B2 | 10/2005 | Flatt et al. |
| 6,956,524 B2 | 10/2005 | Tucker et al. |
| 6,956,564 B1 | 10/2005 | Williams |
| 6,958,690 B1 | 10/2005 | Asher et al. |
| 6,968,296 B2 | 11/2005 | Royle |
| 6,972,698 B2 | 12/2005 | Deguchi |
| 6,975,942 B2 | 12/2005 | Young et al. |
| 6,977,508 B2 | 12/2005 | Pearson et al. |
| 6,992,584 B2 | 1/2006 | Dooley et al. |
| 6,993,088 B2 | 1/2006 | Fling et al. |
| 6,999,021 B2 | 2/2006 | Taylor, Jr. |
| 7,009,399 B2 | 3/2006 | Olsson et al. |
| 7,009,519 B2 | 3/2006 | Leonard et al. |
| 7,038,454 B2 | 5/2006 | Gard et al. |
| 7,042,358 B2 | 5/2006 | Moore |
| 7,048,320 B2 | 5/2006 | Rubel |
| 7,053,789 B2 | 5/2006 | Fling et al. |
| 7,057,383 B2 | 6/2006 | Schlapp et al. |
| 7,062,414 B2 | 6/2006 | Waite et al. |
| 7,079,591 B2 | 7/2006 | Fling et al. |
| 7,091,872 B1 | 8/2006 | Bigelow et al. |
| 7,113,124 B2 | 9/2006 | Waite |
| 7,116,244 B2 | 10/2006 | Fling et al. |
| 7,120,564 B2 | 10/2006 | Pacey |
| 7,235,980 B2 | 6/2007 | Pearson et al. |
| 7,285,958 B2 | 10/2007 | Overby et al. |
| 7,304,480 B1 | 12/2007 | Pearson et al. |
| 7,310,584 B2 | 12/2007 | Royle |
| 7,319,387 B2 | 1/2008 | Willson et al. |
| 7,331,340 B2 | 2/2008 | Barney |
| 7,336,078 B1 | 2/2008 | Merewether et al. |
| 7,339,379 B2 | 3/2008 | Thompson et al. |
| 7,342,537 B2 | 3/2008 | Pearson et al. |
| 7,356,421 B2 | 4/2008 | Gudmundsson et al. |
| 7,358,738 B2 | 4/2008 | Overby et al. |
| 7,372,247 B1 * | 5/2008 | Giusti et al. .............. 324/67 |
| 7,372,276 B2 | 5/2008 | Mulcahey |
| 7,396,177 B2 | 7/2008 | Lapstun et al. |
| 7,396,178 B2 | 7/2008 | Lapstun et al. |
| 7,400,976 B2 | 7/2008 | Young et al. |
| 7,403,012 B2 | 7/2008 | Worsley et al. |
| 7,413,363 B2 | 8/2008 | Lapstun et al. |
| 7,443,154 B1 | 10/2008 | Merewether et al. |
| 7,451,721 B1 | 11/2008 | Garza et al. |
| 7,482,973 B2 | 1/2009 | Tucker et al. |
| 7,500,583 B1 | 3/2009 | Cox |
| 7,532,127 B2 | 5/2009 | Holman et al. |
| 7,636,901 B2 | 12/2009 | Munson |
| 7,640,105 B2 | 12/2009 | Nielsen et al. |
| 7,664,530 B2 | 2/2010 | Skelton |
| 7,733,077 B1 | 6/2010 | Merewether et al. |
| 7,773,095 B1 | 8/2010 | Badrak et al. |
| 7,834,801 B2 | 11/2010 | Waite et al. |
| 7,834,806 B2 | 11/2010 | Tucker et al. |
| 7,889,124 B2 | 2/2011 | Islam et al. |
| 7,889,888 B2 | 2/2011 | Deardorff |
| 7,929,981 B2 | 4/2011 | Sangberg |
| 7,978,129 B2 | 7/2011 | Sawyer et al. |
| 7,986,246 B2 | 7/2011 | Angelis et al. |
| 8,081,112 B2 | 12/2011 | Tucker et al. |
| 8,106,660 B1 | 1/2012 | Merewether et al. |
| 8,118,192 B2 | 2/2012 | Daugherty |
| 8,144,245 B2 | 3/2012 | Vik |
| 8,264,409 B2 | 9/2012 | Miller |
| 8,311,765 B2 | 11/2012 | Nielsen et al. |
| 8,473,148 B2 | 6/2013 | Nielsen et al. |
| 8,480,332 B2 | 7/2013 | Miller |
| 8,532,341 B2 | 9/2013 | Nielsen et al. |
| 8,543,937 B2 | 9/2013 | Nielsen et al. |
| 8,577,707 B2 | 11/2013 | Nielsen et al. |
| 8,589,201 B2 | 11/2013 | Nielsen et al. |
| 8,589,202 B2 | 11/2013 | Nielsen et al. |
| 2001/0029996 A1 | 10/2001 | Robinson |
| 2002/0035432 A1 | 3/2002 | Kubica et al. |
| 2002/0053608 A1 | 5/2002 | Zeck et al. |
| 2002/0103625 A1 | 8/2002 | Card et al. |
| 2002/0115472 A1 | 8/2002 | Andress |
| 2002/0122000 A1 | 9/2002 | Bradley et al. |
| 2002/0130806 A1 | 9/2002 | Taylor et al. |
| 2002/0130906 A1 | 9/2002 | Miyaki |
| 2003/0012411 A1 | 1/2003 | Sjostrom |
| 2003/0058164 A1 | 3/2003 | Zhdanov et al. |
| 2003/0080897 A1 | 5/2003 | Tranchina |
| 2003/0100316 A1 | 5/2003 | Odamura |
| 2003/0135328 A1 | 7/2003 | Burns et al. |
| 2003/0168834 A1 | 9/2003 | Ulrich |
| 2003/0184300 A1 | 10/2003 | Bigelow |
| 2003/0196585 A1 | 10/2003 | McDonald et al. |
| 2004/0006425 A1 | 1/2004 | Wood |
| 2004/0041892 A1 | 3/2004 | Yoneyama et al. |
| 2004/0051368 A1 | 3/2004 | Caputo |
| 2004/0057795 A1 | 3/2004 | Mayfield et al. |
| 2004/0070535 A1 | 4/2004 | Olsson et al. |
| 2004/0124988 A1 | 7/2004 | Leonard et al. |
| 2004/0168358 A1 | 9/2004 | Stump |
| 2004/0210370 A1 | 10/2004 | Gudat |
| 2004/0220731 A1 | 11/2004 | Tucker et al. |
| 2004/0225444 A1 | 11/2004 | Young et al. |
| 2005/0023367 A1 | 2/2005 | Reighard |
| 2005/0034074 A1 | 2/2005 | Munson |
| 2005/0038825 A1 | 2/2005 | Tarabzouni |
| 2005/0040222 A1 | 2/2005 | Robinson |
| 2005/0054457 A1 | 3/2005 | Eyestone et al. |
| 2005/0055142 A1 | 3/2005 | McMurtry et al. |
| 2005/0057745 A1 | 3/2005 | Bontje |
| 2005/0150399 A1 | 7/2005 | Wiley |
| 2005/0156600 A1 | 7/2005 | Olsson |
| 2005/0192727 A1 | 9/2005 | Shostak et al. |
| 2005/0206562 A1 | 9/2005 | Willson et al. |
| 2005/0232475 A1 | 10/2005 | Floeder |
| 2005/0278371 A1 | 12/2005 | Funk et al. |
| 2006/0026020 A1 | 2/2006 | Waite et al. |
| 2006/0055584 A1 | 3/2006 | Waite et al. |
| 2006/0077095 A1 | 4/2006 | Tucker et al. |
| 2006/0085133 A1 | 4/2006 | Young |
| 2006/0085396 A1 | 4/2006 | Evans |
| 2006/0109131 A1 | 5/2006 | Sen et al. |
| 2006/0169776 A1 | 8/2006 | Hornbaker |
| 2006/0220955 A1 | 10/2006 | Hamilton |
| 2006/0244454 A1 | 11/2006 | Gard |
| 2006/0254820 A1 | 11/2006 | Gard et al. |
| 2006/0262963 A1 | 11/2006 | Navulur |
| 2006/0276198 A1 | 12/2006 | Michelon et al. |
| 2006/0276985 A1 | 12/2006 | Xu |
| 2006/0282191 A1 | 12/2006 | Gotfried |
| 2006/0282280 A1 | 12/2006 | Stotz et al. |
| 2006/0285913 A1 | 12/2006 | Koptis |
| 2006/0287900 A1 | 12/2006 | Fiore et al. |
| 2006/0289679 A1 | 12/2006 | Fiore et al. |
| 2007/0013379 A1 | 1/2007 | Staples et al. |
| 2007/0018632 A1 | 1/2007 | Royle |
| 2007/0031042 A1 | 2/2007 | Simental |
| 2007/0040558 A1 | 2/2007 | Overby et al. |
| 2007/0100496 A1 | 5/2007 | Forell |
| 2007/0219722 A1 | 9/2007 | Sawyer, Jr. |
| 2007/0223803 A1 | 9/2007 | Shindo |

(56) References Cited

U.S. PATENT DOCUMENTS

| | | |
|---|---|---|
| 2007/0268110 A1 | 11/2007 | Little |
| 2007/0286021 A1 | 12/2007 | Hoenmans et al. |
| 2007/0288195 A1 | 12/2007 | Waite et al. |
| 2008/0010009 A1 | 1/2008 | Miyoshi |
| 2008/0013940 A1 | 1/2008 | Jung |
| 2008/0125942 A1 | 5/2008 | Tucker et al. |
| 2008/0180322 A1 | 7/2008 | Islam |
| 2008/0204322 A1 | 8/2008 | Oswald et al. |
| 2008/0208415 A1 | 8/2008 | Vik |
| 2008/0228294 A1 | 9/2008 | Nielsen et al. |
| 2008/0245299 A1 | 10/2008 | Nielsen et al. |
| 2008/0255795 A1 | 10/2008 | Shkolnikov |
| 2008/0310721 A1 | 12/2008 | Yang |
| 2009/0004410 A1 | 1/2009 | Thomson et al. |
| 2009/0013928 A1 | 1/2009 | Nielsen et al. |
| 2009/0063258 A1 | 3/2009 | Mueller et al. |
| 2009/0085568 A1 | 4/2009 | Cole |
| 2009/0109081 A1 | 4/2009 | Ryerson |
| 2009/0121933 A1 | 5/2009 | Tucker et al. |
| 2009/0171616 A1 | 7/2009 | Zhang et al. |
| 2009/0185858 A1 | 7/2009 | Malit |
| 2009/0201178 A1 | 8/2009 | Nielsen et al. |
| 2009/0201311 A1 | 8/2009 | Nielsen et al. |
| 2009/0202101 A1 | 8/2009 | Nielsen et al. |
| 2009/0202110 A1 | 8/2009 | Nielsen et al. |
| 2009/0202111 A1 | 8/2009 | Nielsen et al. |
| 2009/0202112 A1 | 8/2009 | Nielsen et al. |
| 2009/0204238 A1 | 8/2009 | Nielsen et al. |
| 2009/0204466 A1 | 8/2009 | Nielsen et al. |
| 2009/0204614 A1 | 8/2009 | Nielsen et al. |
| 2009/0204625 A1 | 8/2009 | Chambers et al. |
| 2009/0207019 A1 | 8/2009 | Nielsen et al. |
| 2009/0210098 A1 | 8/2009 | Nielsen et al. |
| 2009/0210245 A1 | 8/2009 | Wold |
| 2009/0210284 A1 | 8/2009 | Nielsen et al. |
| 2009/0210285 A1 | 8/2009 | Nielsen et al. |
| 2009/0210297 A1 | 8/2009 | Nielsen et al. |
| 2009/0210298 A1 | 8/2009 | Nielsen et al. |
| 2009/0237408 A1 | 9/2009 | Nielsen et al. |
| 2009/0238414 A1 | 9/2009 | Nielsen et al. |
| 2009/0238415 A1 | 9/2009 | Nielsen et al. |
| 2009/0238416 A1 | 9/2009 | Nielsen et al. |
| 2009/0238417 A1 | 9/2009 | Nielsen et al. |
| 2009/0241045 A1 | 9/2009 | Nielsen et al. |
| 2009/0241046 A1 | 9/2009 | Nielsen et al. |
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0045517 A1 | 2/2010 | Tucker et al. |
| 2010/0070347 A1 | 3/2010 | Chen |
| 2010/0084532 A1 | 4/2010 | Nielsen et al. |
| 2010/0085054 A1 | 4/2010 | Nielsen et al. |
| 2010/0085376 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0086677 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0090858 A1 | 4/2010 | Nielsen et al. |
| 2010/0094553 A1 | 4/2010 | Nielsen et al. |
| 2010/0097224 A1 | 4/2010 | Prodanovich |
| 2010/0117654 A1 | 5/2010 | Nielsen et al. |
| 2010/0131903 A1 | 5/2010 | Thomson et al. |
| 2010/0146454 A1 | 6/2010 | Sugahara |
| 2010/0161359 A1 | 6/2010 | Asher |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188245 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0201706 A1 | 8/2010 | Nielsen et al. |
| 2010/0205031 A1 | 8/2010 | Nielsen et al. |
| 2010/0205032 A1 | 8/2010 | Nielsen et al. |
| 2010/0205195 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0205555 A1 | 8/2010 | Nielsen et al. |
| 2010/0207816 A1 | 8/2010 | Islam et al. |
| 2010/0211354 A1 | 8/2010 | Park et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0268786 A1 | 10/2010 | Nielsen et al. |
| 2010/0272885 A1* | 10/2010 | Olsson et al. ............... 427/137 |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0006772 A1 | 1/2011 | Olsson |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0093162 A1 | 4/2011 | Nielsen et al. |
| 2011/0093304 A1 | 4/2011 | Nielsen et al. |
| 2011/0093306 A1 | 4/2011 | Nielsen et al. |
| 2011/0095885 A9 | 4/2011 | Nielsen et al. |
| 2011/0117272 A1 | 5/2011 | Nielsen et al. |
| 2011/0131081 A1 | 6/2011 | Nielsen et al. |
| 2011/0135163 A1 | 6/2011 | Nielsen et al. |
| 2011/0137769 A1 | 6/2011 | Nielsen et al. |
| 2011/0236588 A1 | 9/2011 | Nielsen et al. |
| 2011/0249394 A1 | 10/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0282542 A9 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |

(56) References Cited

U.S. PATENT DOCUMENTS

| | | |
|---|---|---|
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0274476 A1 | 11/2012 | Nielsen et al. |
| 2012/0328162 A1 | 12/2012 | Nielsen et al. |
| 2012/0330849 A1 | 12/2012 | Nielsen et al. |
| 2013/0002854 A1 | 1/2013 | Nielsen et al. |
| 2013/0006718 A1 | 1/2013 | Nielsen et al. |
| 2013/0044918 A1 | 2/2013 | Nielsen et al. |
| 2013/0085670 A1 | 4/2013 | Nielsen et al. |
| 2013/0101180 A1 | 4/2013 | Nielsen et al. |
| 2013/0103318 A1 | 4/2013 | Nielsen et al. |
| 2013/0116855 A1 | 5/2013 | Nielsen et al. |
| 2013/0135343 A1 | 5/2013 | Nielsen et al. |
| 2013/0147637 A1 | 6/2013 | Nielsen et al. |
| 2013/0174072 A9 | 7/2013 | Nielsen et al. |
| 2013/0186333 A1 | 7/2013 | Nielsen et al. |
| 2013/0194303 A1 | 8/2013 | Nielsen et al. |
| 2013/0231984 A1 | 9/2013 | Nielsen et al. |
| 2013/0233883 A1 | 9/2013 | Nielsen et al. |
| 2013/0251894 A1 | 9/2013 | Nielsen et al. |
| 2013/0265138 A1 | 10/2013 | Nielsen et al. |
| 2013/0268199 A1 | 10/2013 | Nielsen et al. |
| 2013/0287500 A1 | 10/2013 | Miller |

FOREIGN PATENT DOCUMENTS

| | | |
|---|---|---|
| CH | 695087 A5 | 12/2005 |
| EP | 0636393 | 2/1995 |
| EP | 1521331 A2 | 4/2005 |
| EP | 1852365 | 11/2007 |
| EP | 1974638 | 10/2008 |
| GB | 2266863 | 11/1993 |
| JP | 10060865 | 3/1998 |
| JP | 2000501666 | 2/2000 |
| JP | 2002079167 | 3/2002 |
| WO | WO 9112119 | 8/1991 |
| WO | WO 9424584 | 10/1994 |
| WO | WO9516827 | 6/1995 |
| WO | WO 9629572 | 9/1996 |
| WO | WO 9854600 | 12/1998 |
| WO | WO 9854601 | 12/1998 |
| WO | WO 9900679 | 1/1999 |
| WO | WO0194016 | 12/2001 |
| WO | WO-0228541 | 4/2002 |
| WO | WO 2004100044 | 11/2004 |
| WO | WO 2004102242 | 11/2004 |
| WO | WO 2005052627 | 6/2005 |
| WO | WO 2006015310 | 2/2006 |
| WO | WO 2006136776 | 12/2006 |
| WO | WO 2006136777 | 12/2006 |
| WO | WO 2007067898 | 6/2007 |
| WO | WO 2008112461 | 9/2008 |

OTHER PUBLICATIONS

Carey, B., "Tracking Shoes," Chicago Tribune Online Edition, Jan. 29, 2007, pp. 1-3, http://www.chicagotribune.com/services/site/premium/access-registered.intercept.
Fox, G. et al., "GPS Provides Quick, Accurate Data for Underground Utility Location," as featured in Apr. 2002 issue of Trenchless Technology, http://www.woolpert.com/asp/articles/GPS-Provides.asp, Sep. 14, 2007, pp. 1 and 2.
Trimble Navigation Limited, "H-Star Technology Explained," pp. 1-9, 2005, www.trimble.com.
Co-pending U.S. Appl. No. 12/429,929, filed Apr. 24, 2009.
Co-pending U.S. Appl. No. 12/539,497, filed Aug. 11, 2009.
Co-pending U.S. Appl. No. 11/685,602, filed Mar. 13, 2007.
Co-pending U.S. Appl. No. 12/236,688, filed Sep. 24, 2008.
Co-pending U.S. Appl. No. 12/363,951, filed Feb. 2, 2009.
Co-pending U.S. Appl. No. 12/364,339, filed Feb. 2, 2009.
Co-pending U.S. Appl. No. 12/364,359, filed Feb. 2, 2009.
Co-pending U.S. Appl. No. 11/696,606, filed Apr. 4, 2007.
Co-Pending U.S. Appl. No. 12/568,087, filed Sep. 28, 2009.
Co-pending U.S. Appl. No. 12/607,843, filed Oct. 28, 2009.
Co-pending U.S. Appl. No. 12/622,768, filed Nov. 20, 2009.
Co-pending U.S. Appl. No. 12/639,041, filed Dec. 16, 2009.
Co-pending U.S. Appl. No. 12/639,373, filed Dec. 16, 2009.
International Search Report and Written Opinion, Application Serial No. PCT/US2008/55796, Oct. 14, 2008.
International Search Report and Written Opinion, Application Serial No. PCT/US2008/55798, Jul. 28, 2008.
International Search Report and Written Opinion, Application Serial No. PCT/US2009/005299, Dec. 12, 2009.
Notice of Allowance dated Nov. 6, 2009 from Co-Pending U.S. Appl. No. 11/685,602.
Office Action dated Nov. 18, 2009 from Co-Pending Canadian Application No. 2,623,466, filed Mar. 4, 2008.
Office Action dated Nov. 23, 2009 from Co-Pending Canadian Application No. 2,623,761, filed Mar. 4, 2008.
Office Action dated Sep. 17, 2009 from Co-Pending U.S. Appl. No. 11/685,602.
International Search Report and Written Opinion, Application Serial No. PCT/US2009/005348, Mar. 2, 2010.
International Search Report and Written Opinion, Application Serial No. PCT/US2009/005359, Feb. 8, 2010.
Office Action mailed Apr. 28, 2009 from Co-Pending U.S. Appl. No. 11/685,602.
U.S. Appl. No. 12/429,947, filed Apr. 24, 2009, Nielsen et al.
U.S. Appl. No. 12/571,411, filed Sep. 30, 2009, Nielsen et al.
U.S. Appl. No. 12/571,408, filed Sep. 30, 2009, Nielsen et al.
U.S. Appl. No. 12/571,401, filed Sep. 30, 2009, Nielsen et al.
U.S. Appl. No. 12/701,496, filed Feb. 5, 2010, Nielsen et al.
U.S. Appl. No. 12/701,468, filed Feb. 5, 2010, Nielsen et al.
U.S. Appl. No. 12/703,958, filed Feb. 11, 2010, Nielsen et al.
U.S. Appl. No. 12/797,169, filed Jun. 9, 2010, Nielsen et al.
U.S. Appl. No. 12/797,202, filed Jun. 9, 2010, Nielsen et al.
U.S. Appl. No. 12/797,211, filed Jun. 9, 2010, Nielsen et al.
U.S. Appl. No. 12/797,227, filed Jun. 9, 2010, Nielsen et al.
U.S. Appl. No. 12/797,243, filed Jun. 9, 2010, Nielsen et al.
U.S. Appl. No. 12/797,262, filed Jun. 9, 2010, Nielsen et al.
U.S. Appl. No. 12/764,164, filed Apr. 21, 2010, Nielsen et al.
U.S. Appl. No. 12/855,977, filed Aug. 13, 2010, Nielsen et al.
U.S. Appl. No. 12/859,394, filed Aug. 19, 2010, Nielsen et al.
U.S. Appl. No. 12/786,929, filed May 25, 2010, Nielsen et al.
U.S. Appl. No. 12/854,370, filed Aug. 11, 2010, Nielsen et al.
Bernold, L. et al. "Equipment operator training in the age of internet2," Proceedings of 19th International Symposium on Automation and Robotics in Construction (ISARC 2002), Sep. 2002 [retrieved on Nov. 12, 2010]. Retrieved from the Internet: <URL: http://fire.nist.gov/bfrlpubsibuild021PDF/b02059.pdf>. p. 4, col. 2, para 2.
European Search Report, Application No. 08743671.3, Nov. 16, 2011.
European Search Report, Application No. 08743673.9, Feb. 28, 2011.
GPS Technology Enhancing Underground Utility Locating, Underground Construction Magazine, Apr. 7, 2010, 4 pages, http://www.undergroundconstructionmagazine.com/print/1034?page=show.
International Search Report and Written Opinion, Application No. PCT/2010/000389, Jun. 2, 2010.
International Search Report and Written Opinion, Application No. PCT/US10/45161, Oct. 29, 2010.
International Search Report and Written Opinion, Application No. PCT/US10/45409, Nov. 18, 2010.
International Search Report and Written Opinion, Application No. PCT/US10/45969, Nov. 18, 2010.
International Search Report and Written Opinion, Application No. PCT/US2009/003957, Mar. 21, 2011.
International Search Report and Written Opinion, Application No. PCT/US2011/047807, Dec. 6, 2011.

(56) References Cited

OTHER PUBLICATIONS

Jung, H.G., Structure Analysis Based Parking Slot Marking Recognition for Semi-automatic Parking System, Springer-Verlag Berlin Heidelberg 2006, 10 pages.
New Mexico's Recommended Marking Guidelines for Underground Utilities, May 2006, 8 pages.
Notice of Allowance dated Jan. 24, 2012 from U.S. Appl. No. 12/363,951.
Notice of Allowance dated Mar. 9, 2012 from U.S. Appl. No. 12/236,688.
Notice of Allowance dated Aug. 25, 2011 from U.S. Appl. No. 11/696,606.
Notice of Allowance dated Apr. 28, 2011 from U.S. Appl. No. 29/356,631.
Notice of Allowance dated Jan. 25, 2012 from Canadian Application No. 2,710,189.
Notice of Allowance dated Nov. 12, 2010 from U.S. Appl. No. 29/356,634.
Notice of Allowance dated Nov. 12, 2010 from U.S. Appl. No. 29/356,633.
Notice of Allowance dated Nov. 12, 2010 from U.S. Appl. No. 29/356,635.
Notice of Allowance dated Nov. 28, 2011 from Canadian Application No. 2,710,269.
Office Action dated Jan. 12, 2012 from U.S. Appl. No. 12/364,369.
Office Action dated Jan. 25, 2012 from U.S. Appl. No. 12/568,087.
Office Action dated Feb. 1, 2011 from Canadian Application No. 2,691,707.
Office Action dated Feb. 9, 2012 from U.S. Appl. No. 12/364,339.
Office Action dated Feb. 28, 2012 from U.S. Appl. No. 12/539,497.
Office Action dated Mar. 2, 2012 from U.S. Appl. No. 12/639,041.
Office Action dated Mar. 13, 2012 from U.S. Appl. No. 12/364,359.
Office Action dated Mar. 20, 2012 from U.S. Appl. No. 12/764,164.
Office Action dated May 24, 2011 from U.S. Appl. No. 12/363,951.
Office Action dated Jun. 16, 2010 from Canadian Application No. 2,691,707.
Office Action dated Sep. 26, 2011 from Canadian Application No. 2,739,119.
Office Action dated Sep. 26, 2011 from Canadian Application No. 2,739,320.
Office Action dated Oct. 4, 2011 from U.S. Appl. No. 12/364,359.
Office Action dated Oct. 20, 2011 from U.S. Appl. No. 12/639,041.
Office Action dated Oct. 24, 2011 from U.S. Appl. No. 12/236,688.
Office Action dated Nov. 9, 2011 from U.S. Appl. No. 12/429,929.
Office Action dated Nov. 15, 2011 from Canadian Application No. 2,691,707.
Office Action dated Dec. 30, 2011 from U.S. Appl. No. 12/701,447.
Office Action dated Jul. 20, 2010 from U.S. Appl. No. 11/696,606.
Office Action dated Jul. 11, 2011 from Canadian Application No. 2713282.
Office Action dated Jun. 28, 2011 from Canadian Application No. 2710269.
Office Action dated Mar. 3, 2011 from Australian Application No. 2008226627.
Office Action dated Mar. 9, 2011 from Australian Application No. 2008236526.
Office Action dated Oct. 6, 2010 from Canadian Application No. 2623761.
Product Data, Hard Hat Aerosols Marking Paint 2300; Rust-oleum Netherlands B.V., Apr. 2005, 1 page, http://www.rustoleum.co.uk/downloads/2300%20Marking%20Spray.pdf.
Product Data, "Inverted Marking Chalk," Rust-oleum, Jul. 2004, 2 pages, http://www.policeone.com/pdfs/markingchalkinfo_ro.pdf.
Virginia Underground utility marking standard, Mar. 2004, 20 pages.
U.S. Appl. No. 13/686,262, filed Nov. 27, 2012, Nielsen et al.
U.S. Appl. No. 13/644,226, filed Oct. 3, 2012, Nielsen et al.
Office Action dated Aug. 15, 2012 from Australian Application No. 2010214104.
Office Action dated Aug. 29, 2012 from U.S. Appl. No. 12/701,447.
Office Action dated Sep. 4, 2012 from U.S. Appl. No. 12/622,768.
Notice of Allowance dated Sep. 5, 2012 from U.S. Appl. No. 12/854,370.
3M Dynatel, Brochure, 2006, 1-4.
3M Dynatel, Locating and Marking System, Brochure, 2007, 1-16.
Office Action dated Sep. 21, 2012 from U.S. Appl. No. 12/797,202.
Office Action dated Sep. 25, 2012 from Australian Application No. 2010214053.
Notice of Allowance dated Oct. 1, 2012 from U.S. Appl. No. 12/607,843.
Office Action dated Oct. 2, 2012 from Japanese Application No. 2010-502170.
Office Action dated Oct. 15, 2012 from U.S. Appl. No. 12/797,227.
Notice of Allowance dated Oct. 17, 2012 from U.S. Appl. No. 12/236,688.
Office Action dated Oct. 19, 2012 from U.S. Appl. No. 12/797,243.
Olsson, Office Action dated Sep. 13, 2012 from U.S. Appl. No. 12/827,993.
Notice of Allowance dated Oct. 25, 2012 from U.S. Appl. No. 12/639,373.
Notice of Allowance dated Nov. 7, 2012 from U.S. Appl. No. 12/639,041.
Office Action dated Nov. 14, 2012 from Canadian Application No. 2,750,908.
Office Action dated Nov. 20, 2012 from U.S. Appl. No. 12/701,468.
Office Action dated Nov. 21, 2012 from U.S. Appl. No. 12/701,496.
Office Action dated Nov. 23, 2012 from U.S. Appl. No. 12/855,977.
Office Action dated Nov. 26, 2012 from U.S. Appl. No. 12/764,164.
Office Action dated Dec. 5, 2012 from U.S. Appl. No. 12/797,262.
Notice of Allowance dated Dec. 12, 2012 from U.S. Appl. No. 12/703,958.
Office Action dated Dec. 18, 2012 from U.S. Appl. No. 12/786,929.
Office Action dated Dec. 20, 2012 from U.S. Appl. No. 12/571,408.
Notice of Allowance dated Dec. 12, 2012 from U.S. Appl. No. 12/364,339.
Luczak, S., "Increasing Accuracy of Tilt Measurements," Engineering Mechanics, vol. 14, 2007, p. 143-154.
Notice of Allowance dated May 2, 2012 from U.S. Appl. No. 12/429,929.
Notice of Allowance dated Jul. 12, 2012 from U.S. Appl. No. 12/539,497.
Notice of Allowance dated Aug. 1, 2012 from U.S. Appl. No. 12/364,339.
Office Action dated Mar. 29, 2012 from GB Application No. 1107052.1.
Office Action dated Apr. 10, 2012 from U.S. Appl. No. 12/854,370.
Office Action dated Apr. 12, 2012 from Canadian Application No. 2,691,707.
Office Action dated Apr. 13, 2012 from Australian Application No. 2008236526.
Office Action dated Apr. 17, 2012 from U.S. Appl. No. 12/607,843.
Office Action dated Apr. 25, 2012 from U.S. Appl. No. 12/363,046.
Office Action dated May 1, 2012 from Australian Application No. 2009300362.
Office Action dated May 15, 2012 from U.S. Appl. No. 12/797,243.
Office Action dated Jun. 1, 2012 from U.S. Appl. No. 12/855,977.
Office Action dated Jun. 4, 2012 from U.S. Appl. No. 12/568,087.
Office Action dated Jun. 4, 2012 from U.S. Appl. No. 12/703,958.
Office Action dated Jun. 8, 2012 from U.S. Appl. No. 12/639,041.
Office Action dated Jun. 13, 2012 from U.S. Appl. No. 12/639,373.
Office Action dated Jun. 18, 2012 from U.S. Appl. No. 12/701,468.
Office Action dated Jun. 18, 2012 from U.S. Appl. No. 12/701,496.
Office Action dated Jul. 2, 2012 from U.S. Appl. No. 12/797,262.
Office Action dated Jul. 12, 2012 from U.S. Appl. No. 12/571,411.
Office Action dated Jul. 26, 2012 from U.S. Appl. No. 12/639,041.
Office Action dated Jul. 27, 2012 from European Application No. 08743671.3.
U.S. Appl. No. 13/751,862, filed Jan. 28, 2013, Nielsen et al.
U.S. Appl. No. 13/795,337, filed Mar. 12, 2013, Nielsen et al.
U.S. Appl. No. 13/797,229, filed Mar. 12, 2013, Nielsen et al.
U.S. Appl. No. 13/834,382, filed Mar. 15, 2013, Nielsen et al.
U.S. Appl. No. 13/846,120, filed Mar. 18, 2013, Nielsen et al.
Notice of Allowance dated Jan. 8, 2013 from U.S. Appl. No. 12/797,243.

(56) References Cited

OTHER PUBLICATIONS

Notice of Allowance dated Jan. 22, 2013 from U.S. Appl. No. 12/703,958.
Notice of Allowance dated Feb. 1, 2013 from U.S. Appl. No. 12/797,202.
Notice of Allowance dated Feb. 13, 2013 from U.S. Appl. No. 12/701,447.
Notice of Allowance dated Feb. 20, 2013 from U.S. Appl. No. 12/364,369.
Notice of Allowance dated Mar. 12, 2013 from U.S. Appl. No. 12/429,929.
Notice of Allowance from U.S. Appl. No. 12/622,768 dated Jan. 24, 2013.
Office Action dated Jan. 19, 2013 from U.S. Appl. No. 12/571,411.
Office Action received Jan. 18, 2013 from Japanese Application No. 2009-553688.
Final Office Action dated Mar. 28, 2013 from U.S. Appl. No. 12/571,408.
Notice of Allowance dated Mar. 28, 2013 from U.S. Appl. No. 12/797,227.
Office Action dated Mar. 20, 2013 from U.S. Appl. No. 12/764,164.
Office Action dated Mar. 25, 2013 from U.S. Appl. No. 12/797,211.
U.S. Appl. No. 13/867,521, filed Apr. 22, 2013, Nielsen et al.
Office Action dated Dec. 28, 2012 from U.S. Appl. No. 12/364,359.
Notice of Alowance daed Apr. 25, 2013 from U.S. Appl. No. 12/364,359.
Office Action dated Apr. 26, 2013 from U.S. Appl. No. 12/859,394.
Corrected Notice of Allowability from U.S. Appl. No. 12/703,958 dated Apr. 18, 2013.
Office Action dated Mar. 13, 2013 from Chinese Application No. 201080045879.1.
Corrected Notice of Allowability from U.S. Appl. No. 12/622,768 dated Apr. 3, 2013.
Office Action dated Feb. 26, 2013 from Canadian Application No. 2,738,968.
Corrected Notice of Allowability from U.S. Appl. No. 12/797,202 dated Apr. 4, 2013.
Corrected Notice of Allowability from U.S. Appl. No. 12/797,277 dated Apr. 17, 2013.
Corrected Notice of Allowability dated May 10, 2013 from U.S. Appl. No. 12/797,227.
Corrected Notice of Allowability dated May 13, 2013 from U.S. Appl. No. 12/429,929.
Corrected Notice of Allowability dated May 14, 2013 from U.S. Appl. No. 12/797,202.
Notice of Allowance dated May 10, 2013 from U.S. Appl. No. 12/797,243.
Office Action dated May 10, 2013 from U.S. Appl. No. 12/786,929.
Combined Search and Examination Report dated Oct. 24, 2013 from GB Application No. 1312313.8.
Complaint for Patent Infringement dated Apr. 10, 2013, *CertusView Technologies LLC* v. *United States Infrastructure Corporation et al.*, Case No. 2:13CV182, USDC Eastern District of Virginia.
Complaint for Patent Infringement dated May 28, 2013, *CertusView Technologies LLC* v. *S&N Locating Services, LLC et al.*, Case No. 1:13CV646, USDC Eastern District of Virginia.
Corrected Notice of Allowability dated Jun. 4, 2013 from U.S. Appl. No. 12/797,243.
Corrected Notice of Allowability dated Nov. 22, 2013 from U.S. Appl. No. 12/797,211.
Decision of Final Rejection dated Apr. 24, 2013 from Japanese Application No. 2010-502170.
European Search Report dated Sep. 25, 2013 from European Application No. 13177282.4.
Examination Report dated Sep. 4, 2013 from European Application No. 10732529.2.
Examination Reported dated Sep. 4, 2013 from GB Application No. GB1107165.1.
Notice of Allowability dated Jul. 5, 2013 from U.S. Appl. No. 12/701,447.
Notice of Allowability dated Jul. 10, 2013 from U.S. Appl. No. 13/795,337.
Notice of Allowance dated Jun. 17, 2013 from Canadian Application No. 2,750,908.
Notice of Allowance dated Jul. 10, 2013 from U.S. Appl. No. 12/571,411.
Notice of Allowance dated Aug. 1, 2013 from U.S. Appl. No. 12/571,401.
Notice of Allowance dated Aug. 2, 2013 from U.S. Appl. No. 12/797,211.
Notice of Allowance dated Aug. 27, 2013 from U.S. Appl. No. 12/855,977.
Notice of Allowance dated Sep. 17, 2013 from U.S. Appl. No. 12/859,394.
Notice of Allowance dated Sep. 25, 2013 from U.S. Appl. No. 12/571,408.
Office Action dated Jun. 17, 2013 from U.S. Appl. No. 12/797,262.
Office Action dated Aug. 7, 2013 from Canadian Application No. 2,739,119.
Office Action dated Aug. 7, 2013 from Canadian Application No. 2,739,320.
Office Action dated Sep. 9, 2013 from U.S. Appl. No. 13/867,521.
Office Action dated Sep. 25, 2013 from U.S. Appl. No. 13/686,262.
Office Action dated Nov. 1, 2013 from Chinese Application No. 201080045879.1 with English Translation.
Office Action dated Nov. 5, 2013 from U.S. Appl. No. 12/979,262.
Supplemental Notice of Allowability dated Aug. 1, 2013 from U.S. Appl. No. 12/571,411.
Nielsen et al., co-pending U.S. Publication No. 2013-0194303, published Aug. 1, 2013.
Nielsen et al., co-pending U.S. Publication No. 2013-0251894, published Sep. 26, 2013.

* cited by examiner

MARKING APPARATUS AND METHODS FOR CREATING AN ELECTRONIC RECORD OF MARKING OPERATIONS

CROSS-REFERENCE TO RELATED APPLICATION

This application claims the benefit under 35 U.S.C. §120 as a continuation of U.S. patent application Ser. No. 12/363,951, filed Feb. 2, 2009 and entitled "Electronically Controlled Marking Apparatus and Methods," which claims the benefit under 35 U.S.C. §120 as a continuation-in-part of U.S. patent application Ser. No. 11/685,602, filed Mar. 13, 2007 and entitled "Marking System and Method with Location and/or Time Tracking," and U.S. patent application Ser. No. 11/696,606, filed Apr. 4, 2007 and entitled "Marking System and Method."

FIELD OF THE INVENTION

This invention relates to marking systems and methods to mark the presence or absence of an underground facility in a dig area.

BACKGROUND

Underground man-made objects, such as utility lines, cables and pipes (hereinafter "underground facilities"), are very susceptible to damage from excavation activities. Local and federal laws require that notification be given to owners of underground facilities in an area to be excavated before any excavation takes place. The owners of the underground facilities typically must locate and mark the location of any underground facilities.

The tasks of locating and marking underground facilities can be performed by either the underground facility owner or by third party contractors. A marking tool is typically used to mark the ground, pavement or other surfaces in order to provide a visual indication of the location of underground facilities. Paint is commonly used as the marker, and it is typically applied using a paint marking tool. The color of the paint is typically chosen based on the type of facility being marked (e.g., red for a power line). However, other types of markers, such as other types of liquids, flags and stakes are also used, and different visual or other characteristics of the marker are used for representing different types of underground facilities. For example, the color, shape or other characteristic of a flag marker can represent a particular type of underground facility (e.g., a square shaped flag can be used to mark a power line).

When paint is used as the marker, a worker marks the location of an underground facility using a paint marking tool to spray paint on the ground to mark the presence or absence of an underground facility. The paint marking tools typically used have a paint canister holder that is adapted to hold a single aerosol can of paint in an axial orientation with respect to the long axis of the aerosol can. The paint marking tool is typically designed to enable a user to walk or stand erect while dispensing the paint.

When an underground facility is located, the worker will load a paint can of the appropriate color for the underground facility being marked into the paint marking tool. When it is time to mark a different type of underground facility, the worker must change the paint can to one of the appropriate color for the new underground facility being marked.

Inaccurate marking of the underground facilities can result in physical damage to underground facilities, property damage, and/or personal injury during the excavation process that, in turn, can expose the underground facility owner or contractor to significant legal liability. When underground facilities are damaged and/or when property damage or personal injury results from hitting a underground facility during an excavation, the excavator may assert that the underground facility was not accurately marked by the entity that carried out the marking, while the entity that marked the underground facility will assert that the underground facility was properly marked. Proving whether the underground facility was properly marked can be difficult after the excavation, because in many cases the paint line used to mark the underground facility will have been disturbed or destroyed during the excavation process.

SUMMARY

According to a first aspect of the invention, a marking apparatus is provided to mark the presence or absence of an underground facility in a dig area. The marking apparatus comprises: a housing configured to enable dispensing of a marker onto the ground for marking the presence or absence of an underground facility in a dig area; a marking dispenser holder affixed to the housing to hold a replaceable marking dispenser; an actuator to enable a user to cause dispensing of the marker from the marking dispenser onto the ground in the dig area, in a marking operation, to mark the presence or absence of an underground facility; and a processing device to log one or more data elements associated with the marking operation in an electronic record of the marking operation.

According to a second aspect of the invention, a method is provided for performing a marking operation for marking the presence or absence of an underground facility in a dig area using a marking apparatus that holds a marking dispenser, comprising dispensing a marker from the marking dispenser onto the ground in the dig area, in a marking operation, to mark the presence or absence of an underground facility, in response to user activation of the marking dispenser; and logging one or more data elements associated with the marking operation in an electronic record of the marking operation.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Figure 1:
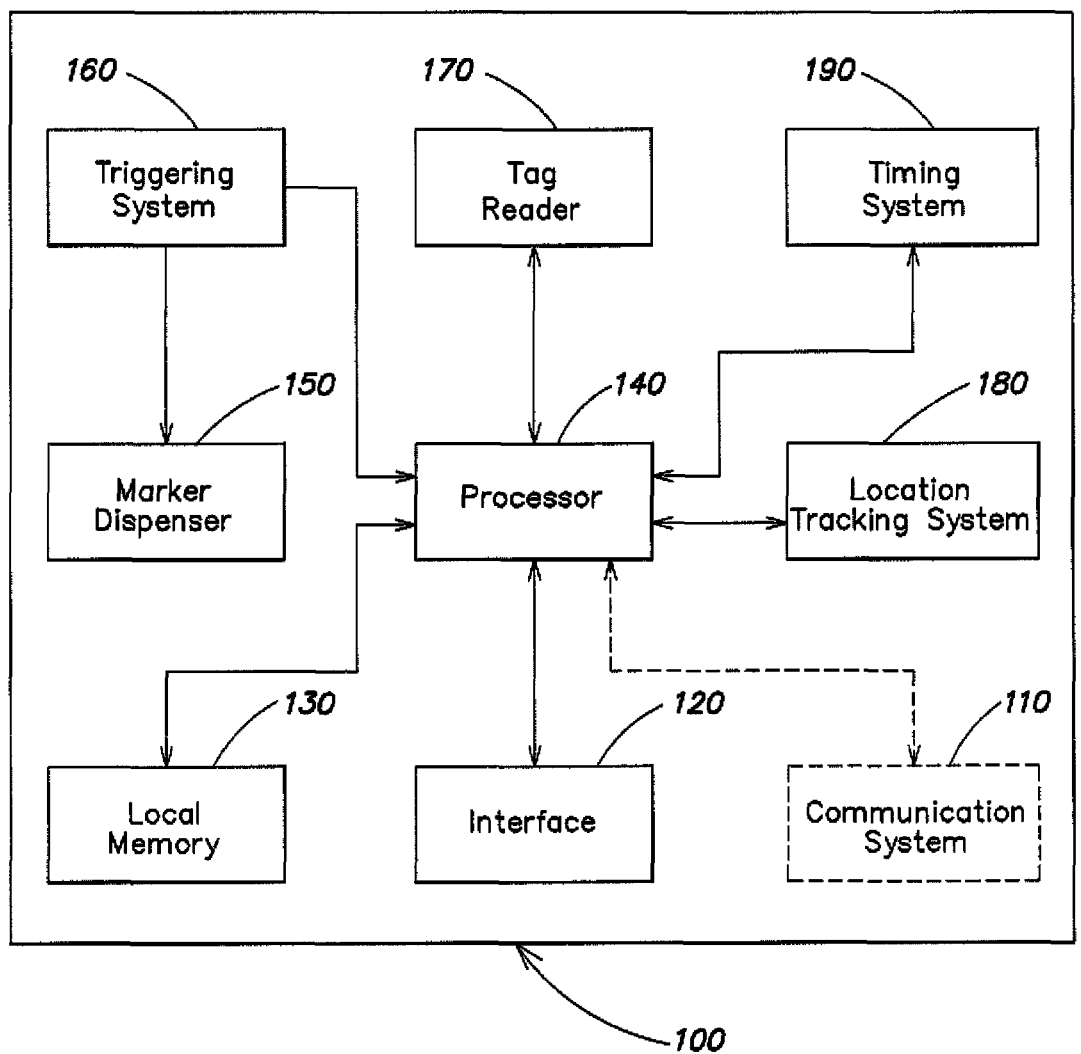
FIG. 1 is a block diagram of an exemplary marking system.

FIG. 1 is a block diagram of an exemplary marking system 100. The system 100 may include a communication system 110, an interface 120, a local memory 130, a processor 140, a marker dispenser 150, a triggering system 160, a tag reader 170, a location tracking system 180, and a timing system 190. In other implementations, system 100 may include additional or different components. In some embodiments, one or more of the communication system 110, the tag reader 170, the location tracking system 180 and the timing system 190 may be omitted, depending on the particular application of the marking system 100.

The system 100 may be used to dispense markers. In one exemplary application of the system 100, the markers may be used to mark underground facilities, such as telecommunications (e.g., telephone and/or cable), power, gas, water, or sewer. The marker that is used to mark underground facilities may include a liquid, such as paint, or objects, such as flags, stakes, etc.

A user may control the operation of the system 100 via interface 120. In one implementation, interface 120 may include a touch screen interface that can provide various operational controls and status indicators of the system 100, and can allow the user to navigate the controls by touching particular areas of the screen. In another implementation, the interface 120 may include another form of input and/or output, such as, for example, a display for displaying information and a keypad for entering information. In either situation, the interface 120 may provide operational controls to function as the triggering system 160.

The triggering system 160 may trigger the dispensing of markers and the storing of marking information. The marking information, which will be described in more detail below, may include information regarding a characteristic of the marker(s) being dispensed, time data (e.g., a timestamp and/or elapsed time information), and/or count data (e.g., a number of times that markers were dispensed). In operation, a user may engage a triggering mechanism in the triggering system 160 (explained in more detail below) in order to dispense the markers. When the triggering mechanism is engaged, the triggering system 160 may also initiate storing of the marking information. This may be done by sending a signal to the processor 140, which may cause processor 140 to store the marking information in local memory 130. Alternatively, or additionally, the processor 140 may store the marking information by transmitting the marking information for storage by a device or system external to system 100. In one implementation, marking information may be stored only when a marker is being dispensed by the marker dispenser 150.

The marker dispenser 150 may hold the markers and may also contain an actuation mechanism (not shown in FIG. 1) that causes the markers to be dispensed when the triggering system 160 is activated. As described above, the markers dispensed by the marker dispenser 150 may include a liquid (e.g., paint) or an object (e.g., flags or stakes). Details of the marker dispenser 150 will be discussed in more detail below.

The system 100 may also include a tag reader 170. In one implementation, tag reader 170 may include a device that can read tags. A "tag," as the term is used herein, may refer to any item that is capable of storing machine-readable information, such as a barcode, a radio frequency identification (RFID) device, or a near field communication (NFC) device. A tag may be passive, active, or any combination thereof. A passive tag may transmit data in response to signals received from tag reader 170. An active tag may continuously transmit data. Tags can be attached to the markers that are loaded into the marker dispenser 150 and can incorporate data that corresponds to one or more characteristics of the marker (e.g., paint color if the marker is paint). Other examples of marker characteristics include, but are not limited to, the type of marker and a shape of marker. The tag reader 170 may incorporate an antenna (not shown) to enable reading the data from a tag (whether passive, active, or any combination thereof). The data read by the tag reader 170 can then be sent to the processor 140 for a determination of the corresponding characteristic. The corresponding characteristic can then be stored in local memory 130, displayed by the interface 120, and/or transmitted external to system 100.

Communication system 110 may include an interface for transmitting data to and/or receiving data from one or more external devices and/or systems located either local to or remote from the system 100. Communication system 110 may include any type of interface, such as an interface for communicating via Ethernet, Bluetooth, Wifi, radio frequency (RF), a wide area network (WAN), or another type of network or protocol.

In one implementation, communication system 110 may send marking information stored in local memory 130 to an external device/system and/or receive information from an external device/system. The marking information may be used by the external device/system to identify a marker dispensed by a user of system 100, identify a time at which the marker was dispensed, and/or determine an amount of the marker used at a particular location.

In one implementation, the system 100 may be used to accurately record the geographic location where markers are dispensed using data from the location tracking system 180 and/or the time at which the markers are dispensed using data from the timing system 190. In one exemplary application of the system 100, the location of markers used to mark underground facilities and/or the time at which the markers are dispensed can be accurately and reliably recorded. The marker that is used to mark underground facilities may include a liquid, such as paint. However, other types of markers, such as objects (e.g., flags, stakes, etc.), may be used in other implementations.

The location tracking system 180 may include any device that can determine its geographic location to a certain degree of accuracy, such as a global positioning system (GPS) or a global navigation satellite system (GNSS) receiver. In another implementation, the location tracking system 180 can include a device that determines location using another technique, such as tower (e.g., cellular tower) triangularization.

The location tracking system 180 may receive location-tracking signals (e.g., GPS signals) and determine its location based on these signals. In one implementation, the location tracking system 180 may be capable of determining its location within less than approximately thirty centimeters.

The timing system 190 may include any device that can output time data to some level of accuracy (e.g., accuracy to the minute, the second, the millisecond, etc.). In one implementation, the timing system 190 may be capable of generating the time data itself. In this situation, the timing system 190 may take the form of a clock. In another implementation, the timing system 190 may receive the time data from another timing system. In this situation, the timing system 190 may take the form of a receiver. In some situations, it may be beneficial for the timing system 190 to be synchronized to another timing system.

The triggering system 160 may trigger the logging of location and/or time data and the dispensing of markers. In one implementation, the system 100 may log location and/or time data only when a marker is being dispensed by the marker dispenser 150. This may be accomplished via a triggering mechanism that, when actuated by the user, triggers both the marker dispenser 150 and the logging of location and/or time data. The location data may be received from the location tracking system 180, and logged and stored in local memory 130 by the processor 140. The time data may be received from the timing system 190, and logged and stored in local memory 130 by the processor 140.

In operation, a user may engage a triggering mechanism in the triggering system 160 (explained in more detail below) in order to dispense the markers. When the triggering mechanism is engaged, the triggering system 160 may also initiate logging of location data received from the location tracking system 180 and/or time data received from the timing system 190. This may be done by sending a signal to the processor 140, which may cause processor 140 to store a log of the location and/or time data in local memory 130.

In one implementation, communication system 110 may send location and/or time data logs stored in local memory 130 to an external device/system and/or receive information from an external device/system. The location data logs may be used by the external device/system to accurately track the location where the markers were dispensed. The time data logs may be used by the external device/system to accurately track a time at which the markers were dispensed.

As discussed above, marking information, count data, location information and/or time data may be stored, or logged, in local memory 130 by processor 140. Alternatively or additionally, the marking information, count data, location information and/or time data may be transmitted to an external device or system, using communication system 110, for storage and/or analysis. The logging and/or transmission of such information may be initiated by actuation of the triggering mechanism for dispensing of markers or by other events, such as operation of tag reader 170.

System 100, as broadly described herein, may be particularly suited for incorporation into marking tools for marking underground utilities. As discussed above, a marking tool is used to mark the ground, pavement or other surfaces in order to provide a visual indication of the location of underground utilities. The type of marker that may be used includes paint that may be supplied in aerosol canisters that are oriented axially with respect to the long axis of the aerosol canisters. The marking tool enables a user to walk or stand erect while dispensing the markers.

If system 100 is incorporated into a paint marking tool, a tag may be attached to the paint canisters to identify a characteristic of the paint, such as the color of the paint in the paint canister. The tag reader 170 can read this paint characteristic (e.g., the color information) from the tag when the paint canister is inserted into the marker dispenser 150, and the processor 140 can display the color information read by the tag reader 170 on the interface 120. Alternatively, or additionally, the color information may be provided to the user in other ways. For example, the color information may be audibly provided to the user (e.g., via a generated voice or a series of beeps or honks). The color information may also, or alternatively, be provided to the user visually in a manner other than via interface 120. For example, the color information may be provided on an object worn or carried by the user (e.g., a pair of glasses, a bracelet, a ring, etc. having display capabilities and/or being capable of changing color).

In one implementation, the processor 140 can estimate how much paint of a particular color has been dispensed. The processor 140 could do this by maintaining a separate timer for each color. The timer for a particular color would increase its count every time the triggering mechanism is activated and that color is mounted in the marker dispenser 150 (which can be determined by reading the tag on the paint canister using the tag reader 170). This information can be useful for managing paint inventory or determining whether the amount of paint used at a particular location is reasonable given the job to be performed at that location.

A paint marking tool is just one possible application of system 100. System 100 can be applied to any marking system that uses markers that can be affixed with tags. Any marker characteristic that a user would find useful can be stored on the tag that is affixed to the marker.

Figure 2:
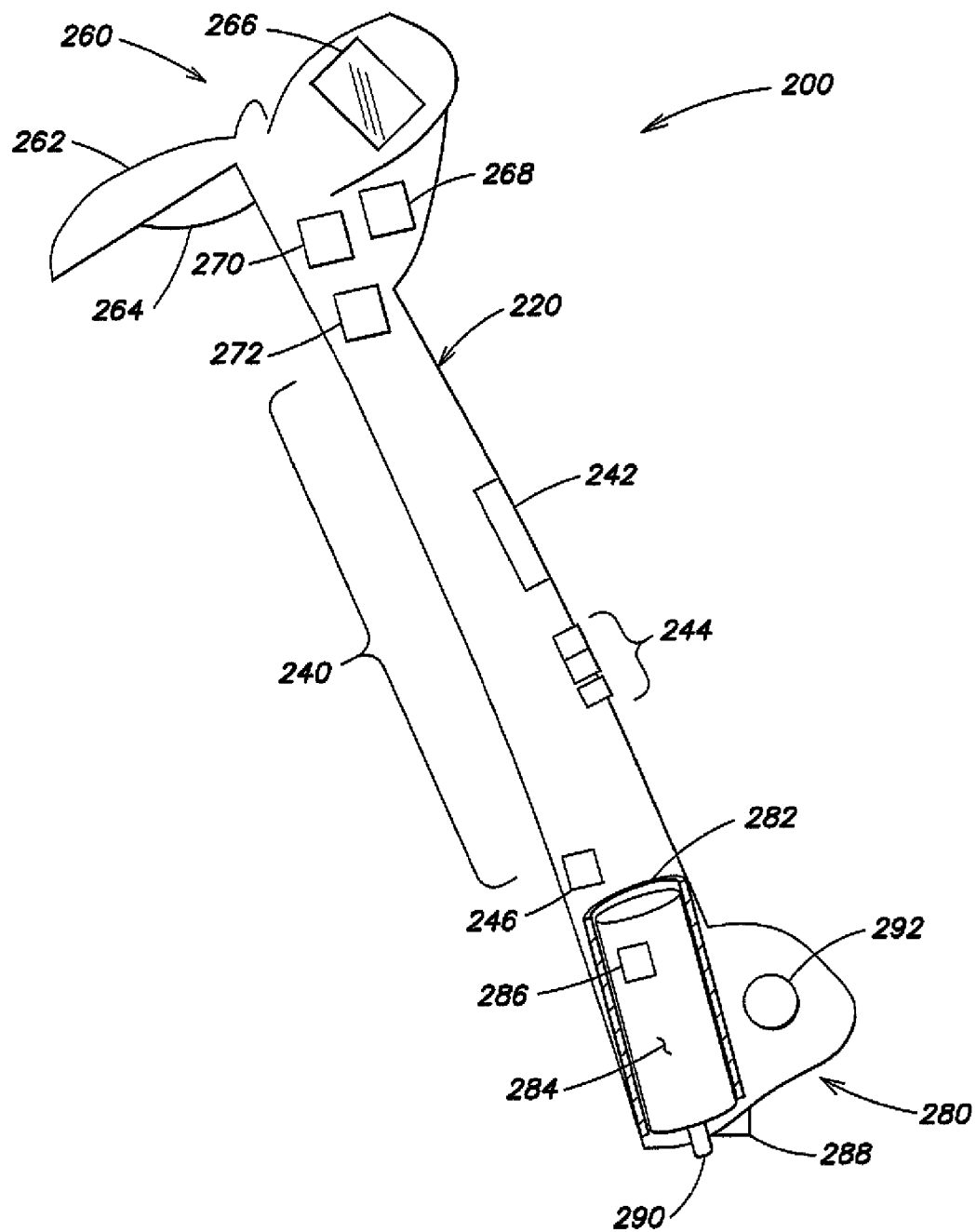
FIG. 2 is a diagram of an exemplary marking tool.

FIG. 2 is a diagram of an exemplary marking tool 200. For the description to follow, assume that the marking tool 200 uses paint as the marker. However, it should be appreciated that any other marker, such as another type of liquid, flags, stakes, etc., may be used in other implementations.

The marking tool 200 may include a housing 220 with an elongated center housing portion 240, a top housing portion 260 and a bottom housing portion 280. The housing 220 may be formed of any at least semi-rigid material, and may be formed of a lightweight material such as aluminum or plastic.

A paint canister holder 282 may be attached to the bottom housing portion 280. The paint canister holder 282 may include an open-ended tubular structure that is attached to the bottom housing portion 280 by any suitable attachment mechanisms, such as rivets, adhesive, mechanical fasteners or the like. The paint canister holder 282 may be formed of any material such as injection-molded plastic, formed sheet metal or any other appropriate material that may be fabricated into an open tubular configuration or any other configuration that will serve to support a paint canister 284 with the paint canister axis substantially parallel to the housing 220.

A tag reader 246, which may include a device that can read tags, may be mounted on or located within the housing 220. The tag reader 246 may incorporate an antenna (not shown) to enable reading of data from a tag. When a tag 286 is attached to a paint canister 284 that incorporates data that corresponds to characteristics of the paint (e.g., paint color), the tag reader 246 may read that data. Other examples of marker characteristics include, but are not limited to, the type of marker and the shape of marker. The data read by the tag reader 246 can then be sent to a processor 268 for a determination of the corresponding characteristic. The corresponding characteristic can then be provided to the user, stored in local memory 270, and/or transmitted external to marking tool 200.

The tag reader 246 may be mounted anywhere on the housing or on the paint canister holder 282. However, the tag reader 246 does not have to be mounted anywhere on the marking tool 200 itself. For example, the tag reader 246 may be carried by a user. In general, the tag reader 246 may be mounted or located at any location, as long as it can receive data transmitted from the tag 286.

An actuation mechanism 288 may be attached to the bottom housing portion 280 at a location from which it can actuate the nozzle 290 of the paint canister 284. The actuation mechanism 288 may include a rigid material that depresses the nozzle 290 when actuated. However, any mechanism may be used to actuate the nozzle 290 of the paint canister 284.

A handle 262 may be provided at the top housing portion 260. The handle 262 may be formed of injection-molded plastic or any other appropriate material, and may be attached to the top housing portion 260 by rivets, adhesive, or any other suitable means. A mechanical trigger 264 may be provided on the top housing portion 260. The mechanical trigger 264 may be located on the handle 262 and attached using any suitable means.

The display 266 may be provided on the top housing portion 260. The display 266 may include a touch-screen display for displaying information to a user, as well as acting as an input device. The processor 268 and the local memory 270 are located in the housing 220. In one implementation, the processor 268 and local memory 270 may be located in the top housing portion 260 so as to be in close proximity to the display 266 and mechanical trigger 264. In another implementation, the processor 268 and local memory 270 may be located elsewhere within the housing 220.

A timer 272 may be provided on the top housing portion 260 or may be located elsewhere within the housing. The timer 272 may include any device that can output time data to some level of accuracy (e.g., accuracy to the minute, the second, the millisecond, etc.). In one implementation, the timer 272 may be capable of generating the time data itself. In this situation, the timer 272 may take the form of a clock. In another implementation, the timer 272 may receive the time data from another device external to marking tool 200. In this situation, the timer 272 may take the form of a receiver. In some situations, it may be beneficial for the timer 272 to be synchronized to another timer. The timer 272 may output time data to the processor 268.

A wireless communication antenna 242 may be located on the housing 220, and used to transmit data, such as marking information, location information and/or time data stored in local memory 270, to an external device/system and/or to receive information from an external device/system.

A location tracking system receiver 292 for receiving location tracking signals (e.g., GPS signals) may be mounted inside the housing 220. In the embodiment of FIG. 2, the location tracking system receiver 292 may be located at the bottom housing portion 280. In another embodiment, the location tracking system receiver 292 may be located elsewhere within or on the housing 220 at a location that optimizes signal reception. However, the location tracking system receiver 292 does not have to be mounted anywhere on the marker tool itself. For example, the location tracking system receiver 292 may be carried by a user. In general, the location tracking system receiver 292 may be mounted or located at any location, as long as it can receive the location tracking signals.

The marking tool 200 may also include one or more input/output ports 244, such as USB, SCSI, Firewire, Ethernet and/or other ports, for interfacing with other equipment and/or computers.

In operation, a user operates the marking tool 200 while standing or walking in an upright manner. A user may control the operation of the tool 200 via display 266, a mechanical trigger 264, and/or a wireless or wired (hereinafter "wireless/wired") interface that may be provided via wireless communication antenna 242 and/or input/output ports 244.

The various operational controls and status indicators of the tool 200 are displayed on display 266, and the user can also navigate the controls by touching particular areas of the display 266. Although a touch-screen display is one form of the display 266, any other type of display or interface may be used such as, for example, a display for displaying information and a keypad for entering information. The user may use the display 266 to trigger the dispensing of paint and the storing, or logging, of marking information, location information and/or time data.

The mechanical trigger 264 may trigger the dispensing of paint and the storing of marking information. In one implementation, the tool 200 may store the marking information only when paint is being dispensed. This may be accomplished by using a mechanical trigger 264 that, when activated by the user, triggers both the actuation mechanism 288 for the paint canister 284 and the storing of the marking information by the processor 268.

The mechanical trigger 264 may trigger the logging of the location data (e.g., GPS coordinate) and/or the time data, and the dispensing of paint. In one implementation, the tool 200 may log the location and/or time data only when paint is being dispensed. This may be accomplished by utilizing a mechanical trigger 264 that, when actuated by the user, substantially simultaneously triggers both the actuation mechanism 288 for the paint canister 284 and the logging of the location and/or time data by the processor 268. The processor 268 may receive the location data from the location tracking system receiver 292, the time data from the timer 272, and store the location and/or time data in local memory 270.

The mechanical trigger 264 can trigger the actuation mechanism 288 via a mechanical connection between the trigger 264 and the actuation mechanism 288. For example, the actuation mechanism 288 can be a rigid material that is connected to the mechanical trigger 264 via a mechanical linkage (not shown), in which case depressing the mechanical trigger 264 may cause the actuation mechanism to apply pressure to the nozzle 290 of the paint canister 284. However, the mechanical trigger 264 may also, or alternatively, trigger the actuation mechanism 288 via an electronic connection. The electronic connection may be a hardwired connection or a wireless connection. If the connection between the mechanical trigger 264 and the actuation mechanism 288 is an electronic connection, the actuation mechanism 288 may include a mechanism for generating the force necessary to depress the nozzle 290 of the paint canister 284.

The wireless/wired interface may be capable of capturing signals that reflect a user's intent. For example, the wireless/wired interface may include a microphone that can capture a user's intent by capturing the user's audible commands. Alternatively, the wireless/wired interface may interact with a device that monitors a condition of the user, such as eye movement, brain activity, or heart rate. In either event, the wireless/wired interface may generate signals that may be sent to the processor 268 for processing. The processor 268 may use the signals to trigger the dispensing of paint and the storing of marking information, location information and/or time data.

Figure 3:
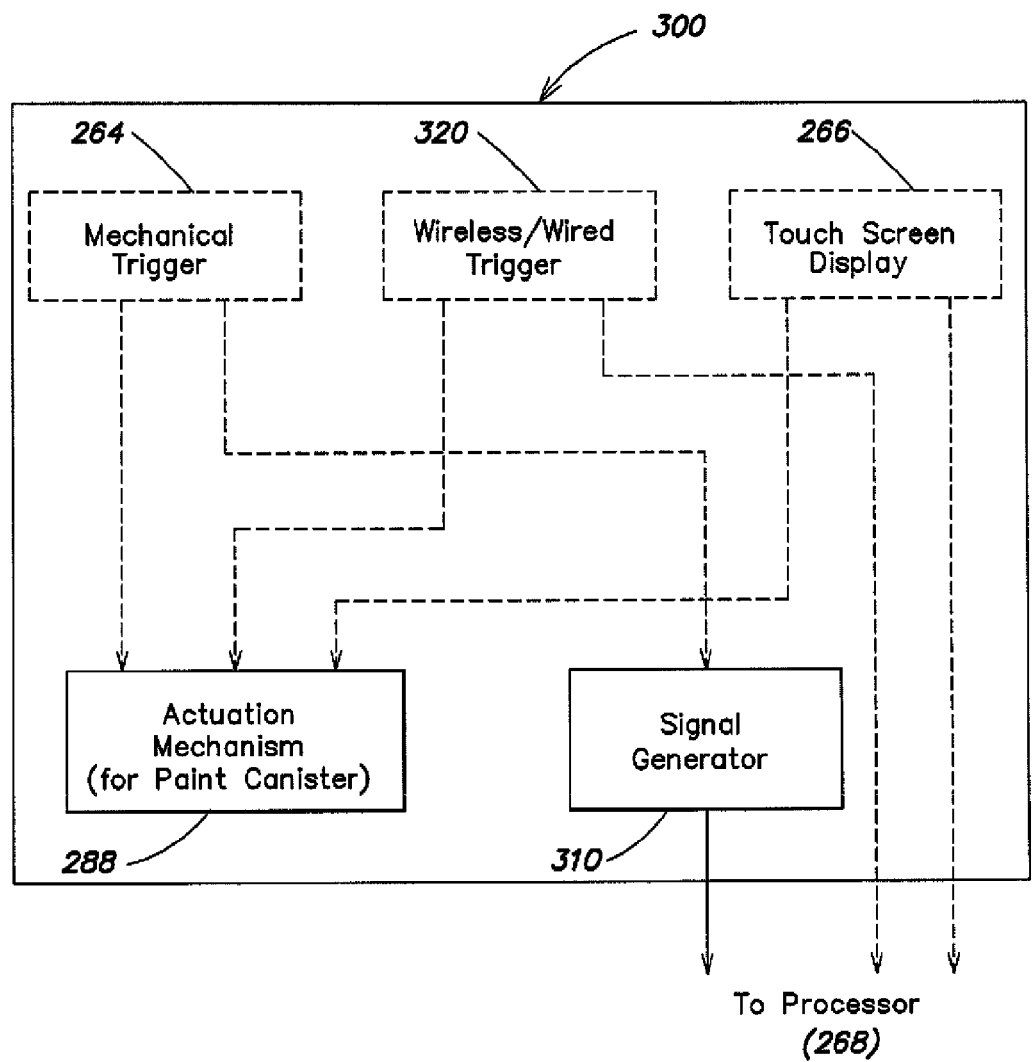
FIG. 3 is a diagram of an exemplary triggering system that may be used in the marking tool of FIG. 2.

FIG. 3 is a diagram of one embodiment of a triggering system 300 that may be used in the marking tool 200 of FIG. 2. As shown in FIG. 3, the triggering system 300 may include the mechanical trigger 264, a wireless/wired trigger 320, and/or a touch screen display 266, the actuation mechanism 288, and a signal generator 310.

In operation, a user may trigger the storing of the marking information, the location information and/or the time data, and the dispensing of paint by activating the mechanical trigger 264. The storing of the marking information, the location information and/or the time data and the dispensing of paint may also, or alternatively, be triggered by a trigger signal from wireless/wired trigger 320 or by choosing a command that is displayed on the touch screen display 266. It should be appreciated that triggering system 300 may include a mechanical trigger 264, a trigger signal from wireless/wired trigger 320, a trigger command on a touch screen display 266, or a combination of a mechanical trigger 264, a trigger signal from wireless/wired trigger 320, and/or a trigger command on a touch screen display 266 for initiating the storing of the marking information, the location information and/or the time data, and the dispensing of paint.

When a user activates the mechanical trigger 264, the actuation mechanism 288 and the signal generator 310 are both activated. The actuation mechanism 288 actuates the nozzle 290 of the paint canister 284, thus dispensing paint out of the paint canister 284. The signal generator 310, when activated, sends a signal to the processor 268 indicating that the mechanical trigger is being activated. As discussed above, this signal could be used to trigger the storing of marking information and/or a timer for keeping track of how much paint of a particular color has been dispensed when a tag 286 that identifies the paint color is attached to the paint canister 284 that is mounted in the paint canister holder 282.

When a user actuates the mechanical trigger 264, the actuation mechanism 288 and the signal generator 310 are both activated. The actuation mechanism 288 actuates the nozzle 290 of the paint canister 284, thus dispensing paint out of the paint canister 284. The signal generator 310, when activated, sends a start log signal to the processor 268 for triggering the logging of location and/or time data. For example, the start log signal may instruct the processor 268 to read, or otherwise obtain, location data from location tracking system 180 (FIG. 1) or the location tracking system receiver 292 (FIG. 2), and store the location data in local memory 130 (FIG. 1) or 270 (FIG. 2). In addition, or alternatively, the start log signal may instruct the processor 268 to read, or otherwise obtain, time data from timing system 190 (FIG. 1) or the timer 272 (FIG. 2), and store the time data in local memory 130 (FIG. 1) or 270 (FIG. 2).

The mechanical trigger 264 can activate the actuation mechanism 288 via a mechanical connection, e.g., a mechanical linkage, between the mechanical trigger 264 and the actuation mechanism 288. Alternatively, the mechanical trigger 264 can activate the actuation mechanism 288 via a wired or wireless electronic connection between the mechanical trigger 264 and the actuation mechanism 288.

If a trigger signal from wireless/wired trigger 320 is used by the user to initiate marking information storing and paint dispersal, the wireless/wired trigger 320 may send a signal to both the actuation mechanism 288 and the processor 268. The signal sent to the actuation mechanism 288 by the wireless/wired trigger 320 may result in the actuation of the nozzle 290 of the paint canister 284 by the actuation mechanism 288. The signal sent to the processor 268 by the wireless/wired trigger 320 may trigger the storing of the marking information, the location information and/or the time data. The signals sent by the wireless/wired trigger 320 to the actuation mechanism 288 and the processor 268 may be sent via a wired or wireless connection.

If a command on the touch screen display 266 is used by the user to initiate storing of marking information, the location information and/or the time data, and paint dispensing, the touch screen display 266 can send a signal to both the actuation mechanism 288 and the processor 268. The signal sent to the actuation mechanism 288 by the touch screen display 266 may result in the actuation of the nozzle 290 of the paint canister 284 by the actuation mechanism 288. The signal sent to the processor 268 by the touch screen display 266 may trigger the storing of the marking information, the location information and/or the time data. The signals sent by the touch screen display 266 to the actuation mechanism 288 and the processor 268 may be sent via a wired or wireless connection.

The marking information may be used by an external device and/or system to identify which markers were dispensed, when the markers were dispensed, and/or an amount of markers that were dispensed. The marking information may be useful to determine whether a user dispensed the correct marker(s) (e.g., the correct color paint) in a particular location. Also, the marking information may be used to visually depict (e.g., in real time as the dispensing occurs) or reconstruct (e.g., at a later time after the dispensing is complete) the dispensing of the markers on an electronic representation of the area that is currently being marked or was previously marked. Also, the marking information may be used to determine whether the job was completed correctly (e.g., that the amount of paint dispensed at the location was reasonable given the job that was to be performed at the location).

The logged location and/or time data may be used by an external device and/or system to track the dispensing of markers with a high degree of accuracy. The logged location and/or time data may be useful when disputes arise regarding whether the dispensed markers were placed in the correct location. Also, the logged data may be used to visually depict (e.g., in real time as the dispensing occurs) or reconstruct (e.g., at a later time after the dispensing is complete) the dispensing of the markers on an electronic representation of the area that is currently being marked or was previously marked.

Figure 4:
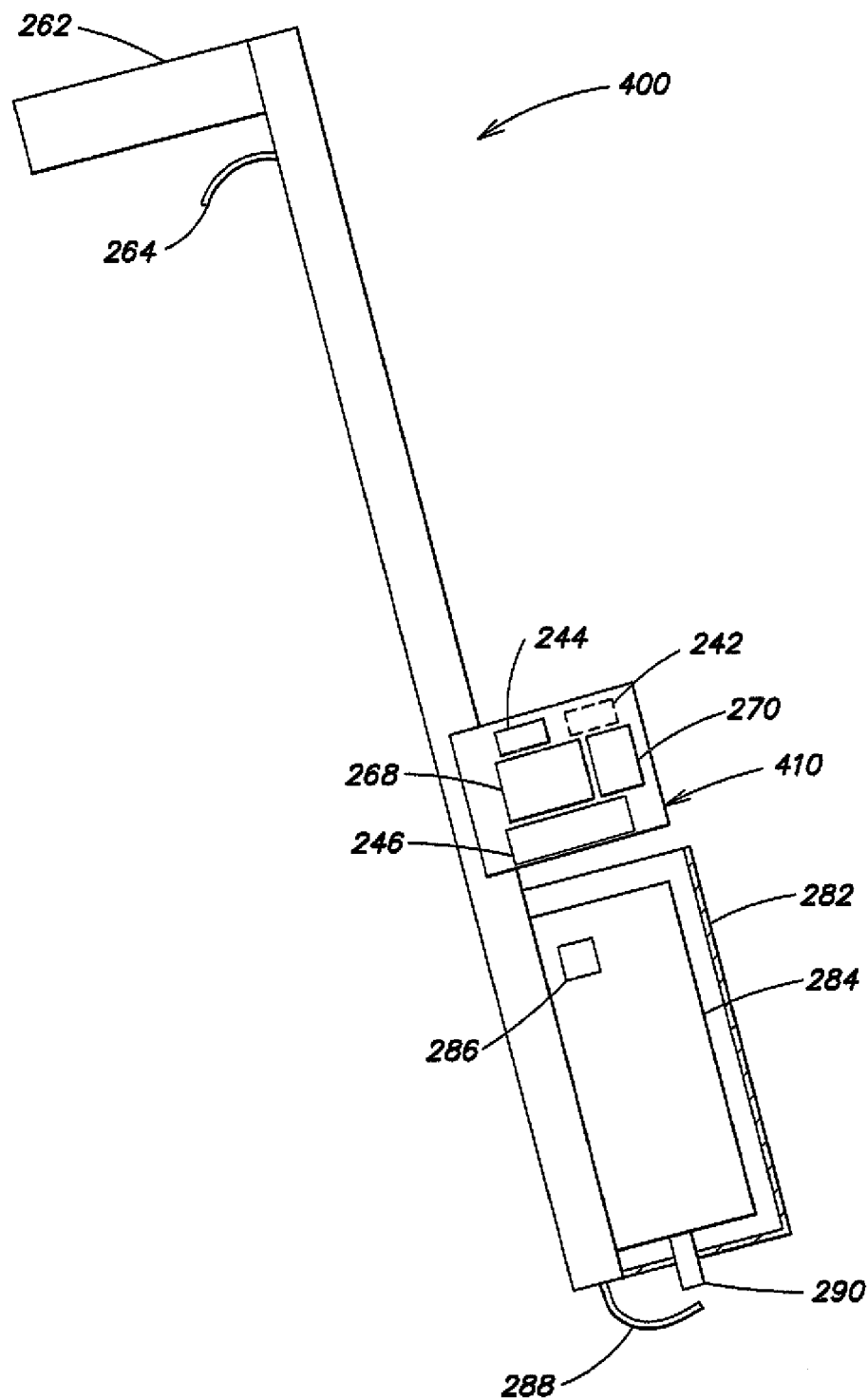
FIG. 4 is a diagram of another exemplary marking tool.

As shown in FIG. 4, the marking system 100 may be incorporated into already existing marking tools by locating the electronics on a board 410 that can be mounted onto an existing marking tool 400. The processor 268, local memory 270, input/output ports 244, tag reader 246 and/or wireless communication antenna 242 may be mounted on the board 410. The board 410 can be attached to the marking tool 400 using any means, such as with fasteners, clamps, glue, etc.

Figure 5:
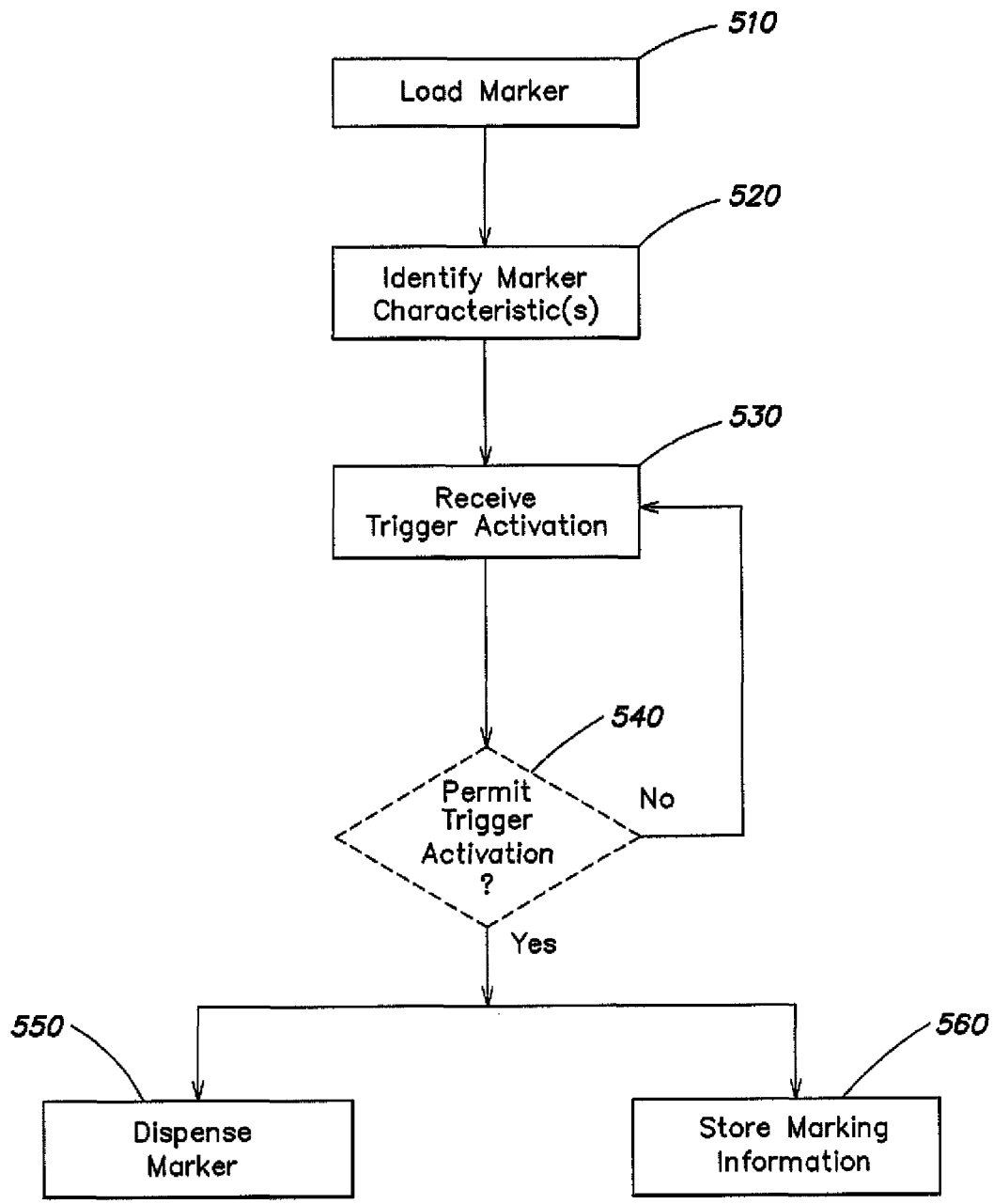
FIG. 5 is a flowchart of an exemplary process for marking an area.

FIG. 5 is a flowchart of an exemplary process for marking an area. The process of FIG. 5 may begin with a user of a marking tool, such as marking tool 200 (FIG. 2), being dispatched to a location to be marked. The user might be given a ticket that identifies what utilities the user needs to mark at the location. The ticket might specify, for example, the location to be marked, the day and/or time that the location is to be marked, and/or whether the user is to mark the location for telecommunications (e.g., telephone and/or cable), power, gas, water, and/or sewer. The user might arrive at the location and take his/her marking tool out of his/her vehicle. In some situations, the user might load his/her pockets with extra markers (e.g., extra canisters of the same color of paint or different colors of paint).

A marker may be loaded into the marking tool (block 510). For example, the user may load a paint canister 284 of the appropriate color into paint canister holder 282. If the user is going to mark power, for example, the user might load a paint canister 284 containing red paint. The paint canister 284 may be loaded such that nozzle 290 extends out of the bottom of the marking tool 200, as illustrated in FIG. 2.

In one implementation, as described above, a tag 286 may be affixed to the paint canister 284. The tag 286 may store information regarding one or more characteristics of the marker. For example, the tag 286 may identify the type of marker (e.g., paint, flag, stake, etc.), the color of marker (e.g., orange, red, yellow, blue, or green), and/or the shape of the marker (e.g., square, triangular, circular, etc.).

The marker characteristic(s) may be identified (block 520). In one implementation, the marker characteristic(s) may be automatically determined. For example, data from the tag 286 may be read by tag reader 246 and sent to processor 268. The processor 268 may determine the marker characteristic(s) from this data, and cause information regarding the marker characteristic(s) to be presented to the user (e.g., visually and/or audibly).

For example, a user interface may identify a characteristic of the marker. The user interface may optionally request the user to confirm that the user intended to load a marker with the identified characteristic. The confirmation may establish that the user actually looked at the user interface before performing any marking operation. In one implementation, the user may be unable to activate a trigger for dispensing a marker if the user does not confirm that the correct marker is loaded.

In another implementation, the marker characteristic(s) may be manually determined. For example, the user may specify the marker characteristic(s) via a user interface. The user interface may identify a number of possible characteristics (e.g., paint colors) of the marker. In this case, the user interface may request that that user select the paint color to be dispensed. The user interface may also identify the utility that corresponds to each of the possible paint colors so that the user can confirm that the correct marker is loaded.

Trigger activation may be received (block 530). For example, the user may effect trigger activation by applying pressure to the mechanical trigger 264 with his/her hand. Alternatively, or additionally, the user may effect trigger activation by, for example, speaking a particular command to cause a trigger signal to be output by wireless/wired trigger 320. Alternatively, or additionally, the user may effect trigger activation by touching a particular area of display 266 to cause a trigger command to be output by display 266.

It may optionally be determined whether to permit trigger activation (block 540). For example, the user may be required to confirm that a marker with the correct marker characteristic was loaded before trigger activation may be permitted. Alternatively, the marking tool 200 may be loaded with information from the user's ticket. In this case, trigger activation may be prevented when the marker characteristic of the marker does not match the ticket information. For example, if the ticket information indicates that the user is to dispense blue and yellow paint at a particular location, then activation of the trigger may be permitted if blue or yellow paint is loaded into the marking tool 200, and activation of the trigger may be prevented otherwise.

If activation of the trigger is permitted, then a marker may be dispensed (block 550), and marking information may be stored (block 560). To dispense a marker (block 550), the actuation mechanism 288 may be activated to cause the nozzle 290 of the paint canister 284 to be depressed, which may cause paint from the paint canister 284 to be output via the nozzle 290.

To store marking information (block 560), a signal may be sent to the processor 268. The signal may be sent from the signal generator 310, the wireless/wired trigger 320, and/or the display 266, as described above. The signal may instruct the processor 268 to store the marking information. For example, the processor 268 may store the marking information in local memory 270. In this case, the processor 268 may create an entry in local memory 270. Alternatively, or additionally, the processor 268 may store the marking information by transmitting the marking information for storage by a device or system external to marking tool 200.

Figure 6A:
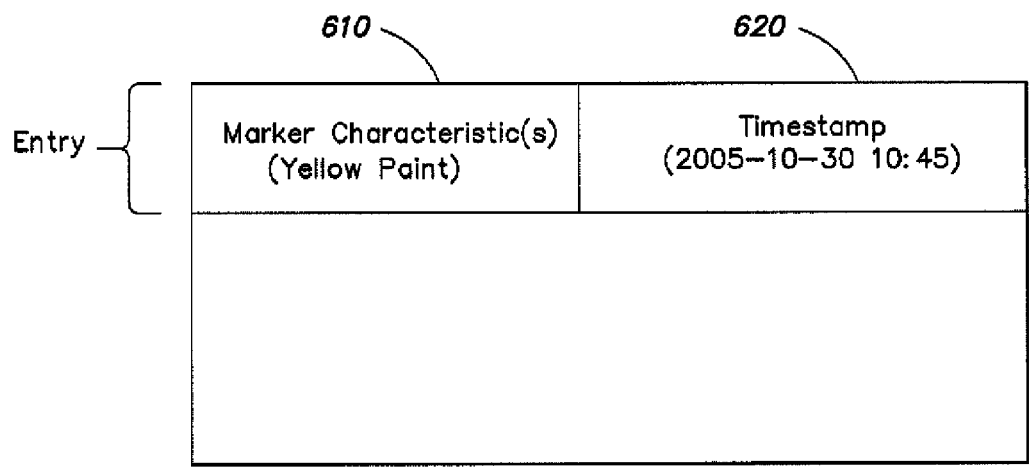
FIGS. 6A-6C are diagrams of exemplary entries that can be created.

FIG. 6A is a diagram of an exemplary entry that may be created. As shown in FIG. 6A, an entry may include a marker characteristic(s) field 610 and a timestamp field 620. The marker characteristic(s) field 610 may include information regarding one or more marker characteristics, such as marker color, marker shape, or marker type. The information in the marker characteristic(s) field 610 is shown in FIG. 6A as "yellow" or "yellow paint"—although any type of descriptive information may be used. The timestamp field 620 may include time data that identifies the day and/or time that the marker was dispensed. The time data in the timestamp field 620 is shown in FIG. 6A as 10:45 a.m. on Oct. 20, 2005—although any type of date and/or time code may be used. As explained above, the marking information may be useful to determine whether the user dispensed the correct marker(s) (e.g., the correct color paint) in a particular location. For example, the user's ticket may identify what underground facilities were to be marked in the area. The marking information may help insure that the job was completed correctly.

Figure 6B:
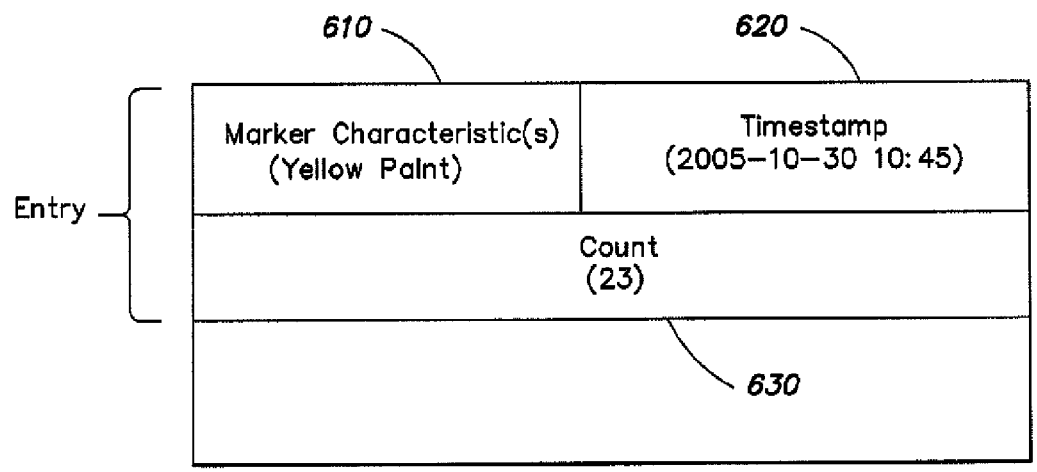

FIG. 6B is a diagram of another exemplary entry that may be created. As shown in FIG. 6B, an entry may include a marker characteristic(s) field 610, a timestamp field 620, and a count field 630. The marker characteristic(s) field 610 and the timestamp field 620 may be similar to the similarly named fields in FIG. 6A. The count field 630 may include information that identifies the number of times that the user activated the trigger to dispense a marker (e.g., yellow paint). The information in the count field 630 is shown in FIG. 6B as twenty-three—although any count value can be used. The information in the count field 630 may be useful to determine or estimate an amount of paint that was dispensed at the location and, thus, whether the amount of paint was reasonable given the job that was to be performed.

Figure 6C:
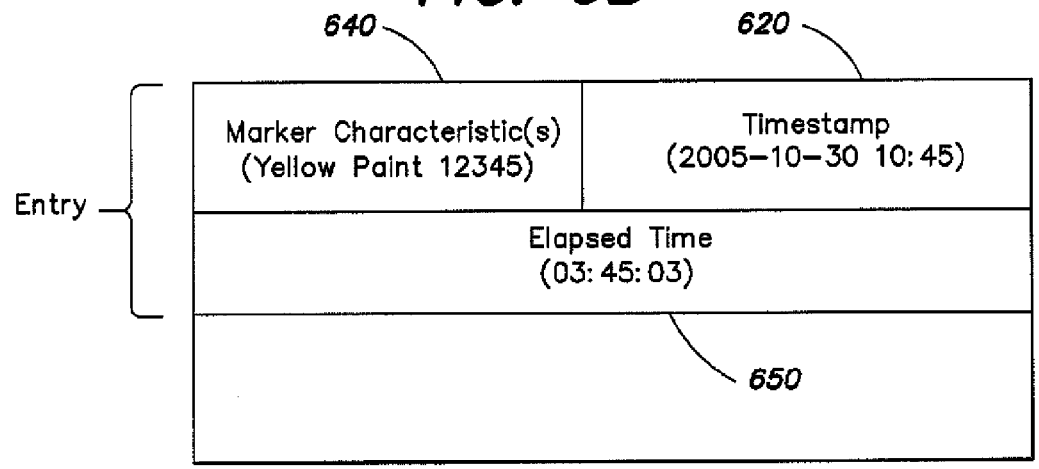

FIG. 6C is a diagram of another exemplary entry that may be created. As shown in FIG. 6C, an entry may include a marker characteristic(s) field 640, a timestamp field 620, and an elapsed time field 650. The marker characteristic(s) field 640 and the timestamp field 620 may be similar to the similarly named fields in FIG. 6A. In this case, however, the marker characteristic(s) field 640 may additionally store an identifier that identifies a particular marker (e.g., a particular canister of paint). The identifier is shown in FIG. 6C as "12345"—although any type of identifier may be used.

The elapsed time field 650 may include information that identifies the amount of time that has elapsed from when the user activated the trigger for dispensing a marker (e.g., yellow paint) to when the user ceased activating the trigger. The information in the elapsed time field 650 is shown in FIG. 6C as three minutes, forty five seconds, and three one hundredths of a second—although any time code can be used. The information in the elapsed time field 650 may be useful to determine or estimate when a supply of markers is nearly empty. The information in the elapsed time field 650 may help determine when to replace the canister. The elapsed time or a signal indicating that a supply of markers needs to be replaced may be presented to the user visually and/or audibly. The information in the elapsed time field 650 may also, or alternatively, be useful to determine or estimate an amount of markers used in a particular location.

While three exemplary entries have been described with regard to FIGS. 6A-6C, an entry may include more, fewer, different, or combinations of the fields shown in FIGS. 6A-6C.

The foregoing description is not intended to be exhaustive or to limit the description to the precise form disclosed. Modifications and variations are possible in light of the above disclosure or may be acquired from practice of the invention.

For example, the processors 140 and 268 can be general purpose computers. Alternatively, they can be special purpose computers, programmed microprocessors or microcontrollers and peripheral integrated circuit elements, ASICs or other integrated circuits, hardwired electronic or logic circuits such as discrete element circuits, programmable logic devices such as FPGA, PLD, PLA or PAL or the like. In general, any device capable of executing code can be used to implement processors 140 and 268. Local memories 130 and 270 can be implemented with any type of electronic memory and/or storage device using any type of media, such as magnetic, optical or other media.

Further, while a series of blocks have been illustrated in FIG. 5, the order of the blocks may differ in other implementations. Also, non-dependent blocks may be performed in parallel.

Also, it has been described that information regarding an elapsed time can be used to determine or estimate when a supply of markers is nearly empty. In another implementation, a sensor may be used to detect a weight of a paint canister 284. The sensor may be placed on the paint canister 284 or within the paint canister holder 282. The weight of the paint canister 284 may be used to estimate how full or empty the paint canister 284 is. This information may be provided to an operator of the marking tool 200 visually and/or audibly. In one implementation, replacing the paint canister 284 may trigger the identification of the marker characteristic (e.g., paint color) by the tag reader 246. This may help reduce the overall battery life of the tag reader 246 and/or the tag 286 by limiting the number of times that the tag reader 246 is used (e.g., only obtain the marker characteristic when the paint canister 284 is initially loaded into paint canister holder 282).

It will be apparent that aspects, as described above, may be implemented in many different forms of software, firmware, and hardware in the implementations illustrated in the figures. The actual software code or specialized control hardware used to implement these aspects is not limiting of the description provided herein. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A marking apparatus to mark the presence or absence of an underground facility in a dig area, comprising:
   a housing configured to enable dispensing of a marker onto the ground for marking the presence or absence of an underground facility in a dig area;
   a marker dispenser holder affixed to the housing to hold a replaceable marker dispenser;
   an actuator coupled to the housing to enable a user to cause dispensing of the marker from the marker dispenser onto the ground in the dig area, in a marking operation, to mark the presence or absence of an underground facility;
   a processing device configured to cause, in response to the user causing dispensing of the marker, logging of one or more data elements associated with the marking operation in an electronic record of the marking operation; and
   a location tracking system configured to determine geographical coordinates of the marker, wherein the processing device logs the geographic coordinates of the marker in the electronic record of the marking operation in response to the user causing dispensing of the marker from the marker dispenser via the actuator.

2. A marking apparatus as defined in claim 1, further comprising a clock generator to generate a current date and time, wherein the processing device logs the current date and time in the electronic record of the marking operation in response to user activation of the marker dispenser.

3. A marking apparatus as defined in claim 1, further comprising a tag reader to read tag information from a tag associated with the marking marker dispenser, wherein the processing device logs the tag information in the electronic record of the marking operation in response to user activation of the marker dispenser.

4. A marking apparatus as defined in claim 1, further comprising a clock generator to generate a current date and time and a tag reader to read tag information from a tag associated with the marker dispenser, wherein the processing device logs the current date and time and the tag information in the electronic record of the marking operation in response to user activation of the marker dispenser.

5. A marking apparatus as defined in claim 1, wherein the processing device logs a count of user activations of the marker dispenser in the electronic record of the marking operation.

6. A marking apparatus as defined in claim 1, wherein the processing device logs an elapsed time of user activation of the marker dispenser in the electronic record of the marking operation.

7. A marking apparatus as defined in claim 1, further comprising a local memory, wherein the electronic record of the marking operation is stored in the local memory.

8. A marking apparatus as defined in claim 3, wherein the tag information includes one or more data elements including a marker type, a marker color and a marker shape.

9. A marking apparatus as defined in claim 1, further comprising a weight sensor to sense a weight of the marker dispenser, wherein the processing device logs the weight of the marker dispenser in the electronic record of the marking operation.

10. A marking apparatus as defined in claim 1, wherein the electronic record includes one or more entries, each of the entries having one or more data fields.

11. A method for performing a marking operation for marking the presence or absence of an underground facility in a dig area using a marking apparatus that holds a marker dispenser, comprising:
    dispensing a marker from the marker dispenser onto the ground in the dig area, in a marking operation, to mark the presence or absence of an underground facility, in response to user activation of the marker dispenser to cause dispensing of the marker;
    causing, via a processing device and in response to the user activation causing dispensing of the marker, logging of one or more data elements associated with the marking operation in an electronic record of the marking operation; and
    determining geographical coordinates of the marker and logging the geographical coordinates of the marker in the electronic record of the marking operation in response to user activation of the marker dispenser.

12. A method for operating a marking apparatus as defined in claim 11, further comprising generating a current date and time, and logging the current date and time in the electronic record of the marking operation in response to user activation of the marker dispenser.

13. A method for operating a marking apparatus as defined in claim 11, further comprising reading tag information from a tag associated with the marker dispenser and logging the tag information in the electronic record of the marking operation in response to user activation of the marker dispenser.

14. A method for operating a marking apparatus as defined in claim 11, further comprising generating a current date and time, reading tag information from a tag associated with the marker dispenser, and logging the current date and time and the tag information in the electronic record of the marking operation in response to user activation of the marker dispenser.

15. A method for operating a marking apparatus as defined in claim 11, further comprising logging a count of user activations of the marker dispenser in the electronic record of the marking operation.

16. A method for operating a marking apparatus as defined in claim 11, further comprising logging an elapsed time of user activation of the marker dispenser in the electronic record of the marking operation.

17. A method for operating a marking apparatus as defined in claim 11, further comprising storing the electronic record of the marking operation in a local memory of the marking apparatus.

18. A method for operating a marking apparatus as defined in claim 13, wherein logging the tag information includes logging one or more data elements including a marker type, a marker color and a marker shape.

19. A method for operating a marking apparatus as defined in claim 11, further comprising sensing a weight of the marker dispenser and logging the weight in the electronic record of the marking operation.

20. A method for operating a marking apparatus as defined in claim 11, wherein the electronic record includes one or more entries, each of the entries having one or more data fields.

\* \* \* \* \*